(12) United States Patent
MacDonald

(10) Patent No.: US 7,717,711 B2
(45) Date of Patent: May 18, 2010

(54) COLLAPSIBLE MOTION PLATFORM

(75) Inventor: Sean Patrick MacDonald, Marietta, GA (US)

(73) Assignee: Sean MacDonald, Marietta, GA (US)

( * ) Notice: Subject to any disclaimer, the term of this patent is extended or adjusted under 35 U.S.C. 154(b) by 885 days.

(21) Appl. No.: 11/219,059

(22) Filed: Sep. 2, 2005

(65) Prior Publication Data

US 2006/0046230 A1 Mar. 2, 2006

Related U.S. Application Data

(60) Provisional application No. 60/606,652, filed on Sep. 2, 2004.

(51) Int. Cl.
*G09B 19/16* (2006.01)

(52) U.S. Cl. .................................... 434/55

(58) Field of Classification Search ................ 434/29, 434/30, 38, 43, 45, 46, 51, 55, 58, 59, 61, 434/62; 472/59, 60
See application file for complete search history.

(56) References Cited

U.S. PATENT DOCUMENTS

| | | | | |
|---|---|---|---|---|
| 2,243,973 | A * | 6/1941 | Mills, Jr. ..................... 434/51 |
| 3,693,265 | A * | 9/1972 | Alexander et al. .......... 434/372 |
| 4,019,261 | A * | 4/1977 | Pancoe ........................ 434/58 |
| 4,527,980 | A * | 7/1985 | Miller ......................... 434/55 |
| 5,006,072 | A * | 4/1991 | Letovsky et al. ............. 434/61 |
| 5,060,932 | A * | 10/1991 | Yamaguchi .................. 472/47 |
| 5,158,459 | A * | 10/1992 | Edelberg ...................... 434/45 |
| 5,415,550 | A * | 5/1995 | Aoki et al. ................... 434/61 |
| 5,782,639 | A * | 7/1998 | Beal ............................ 434/29 |
| 5,853,330 | A * | 12/1998 | Engstrand .................... 472/60 |
| 5,860,808 | A * | 1/1999 | Yoshimoto et al. ........... 434/55 |
| 5,885,080 | A * | 3/1999 | Letovsky ..................... 434/62 |
| 5,911,634 | A * | 6/1999 | Nidata et al. ................. 472/59 |
| 5,951,018 | A * | 9/1999 | Mamitsu ..................... 273/442 |
| 5,997,303 | A * | 12/1999 | Yoshida et al. ............... 434/62 |
| 6,077,078 | A * | 6/2000 | Alet et al. .................... 434/55 |
| 6,142,877 | A * | 11/2000 | Nishimura ................... 463/46 |
| 6,210,165 | B1 * | 4/2001 | Sugimori .................... 434/61 |
| 6,733,293 | B2 * | 5/2004 | Baker et al. .................. 434/55 |
| 6,851,950 | B1 * | 2/2005 | Gamnig ....................... 434/45 |
| 7,021,937 | B2 * | 4/2006 | Simpson et al. .............. 434/62 |
| 7,031,384 | B2 * | 4/2006 | Kondo et al. ........... 375/240.01 |
| 7,033,176 | B2 * | 4/2006 | Feldman et al. .............. 434/55 |
| 7,347,779 | B2 * | 3/2008 | James-Herbert ............. 463/36 |
| 7,422,524 | B2 * | 9/2008 | Gregorian ................... 472/119 |
| 2002/0164560 | A1* | 11/2002 | Borta ........................... 434/55 |
| 2003/0151281 | A1* | 8/2003 | Williams .................... 297/250.1 |

* cited by examiner

*Primary Examiner*—Kurt Fernstrom

(57) ABSTRACT

A collapsible, portable motion platform for use with video games, personal computers, simulators, and virtual reality systems is disclosed. The motion platform may include a motion control system including user adjustable regulating devices for setting the range of motion, acceleration and other motion elements in one or more degrees of freedom. The framing may be collapsible and may include an enclosure case. One embodiment of the platform is lightweight and portable, and includes an enclosure case for protection in storage.

27 Claims, 17 Drawing Sheets

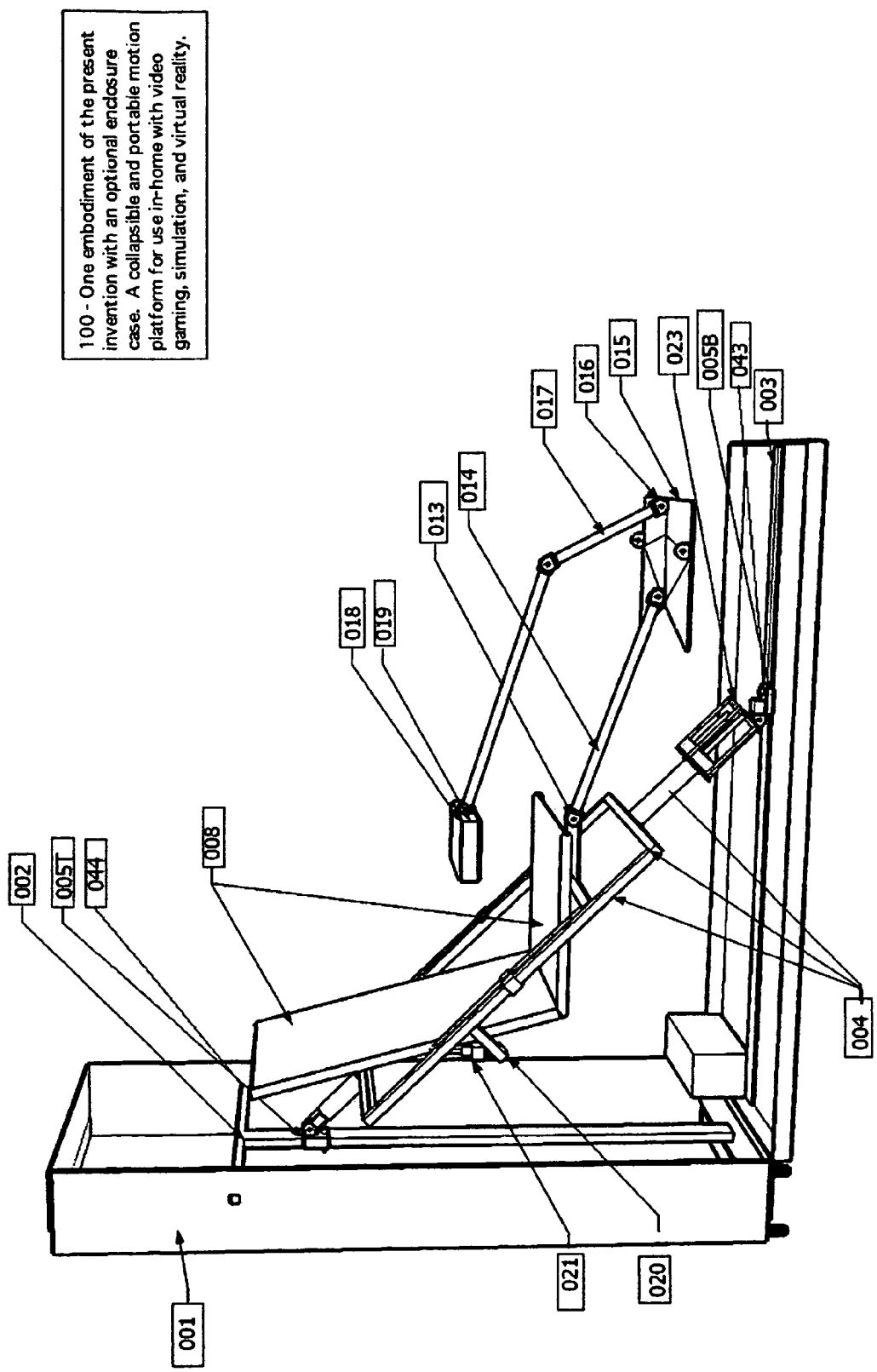
FIGURE 1 - left side elevation of one embodiment

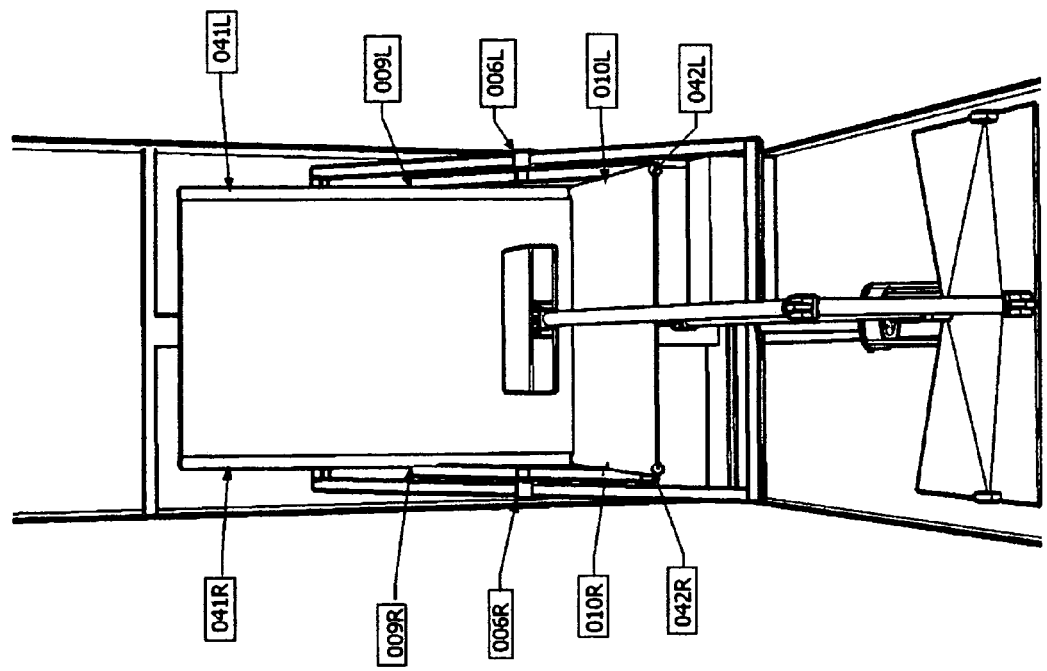

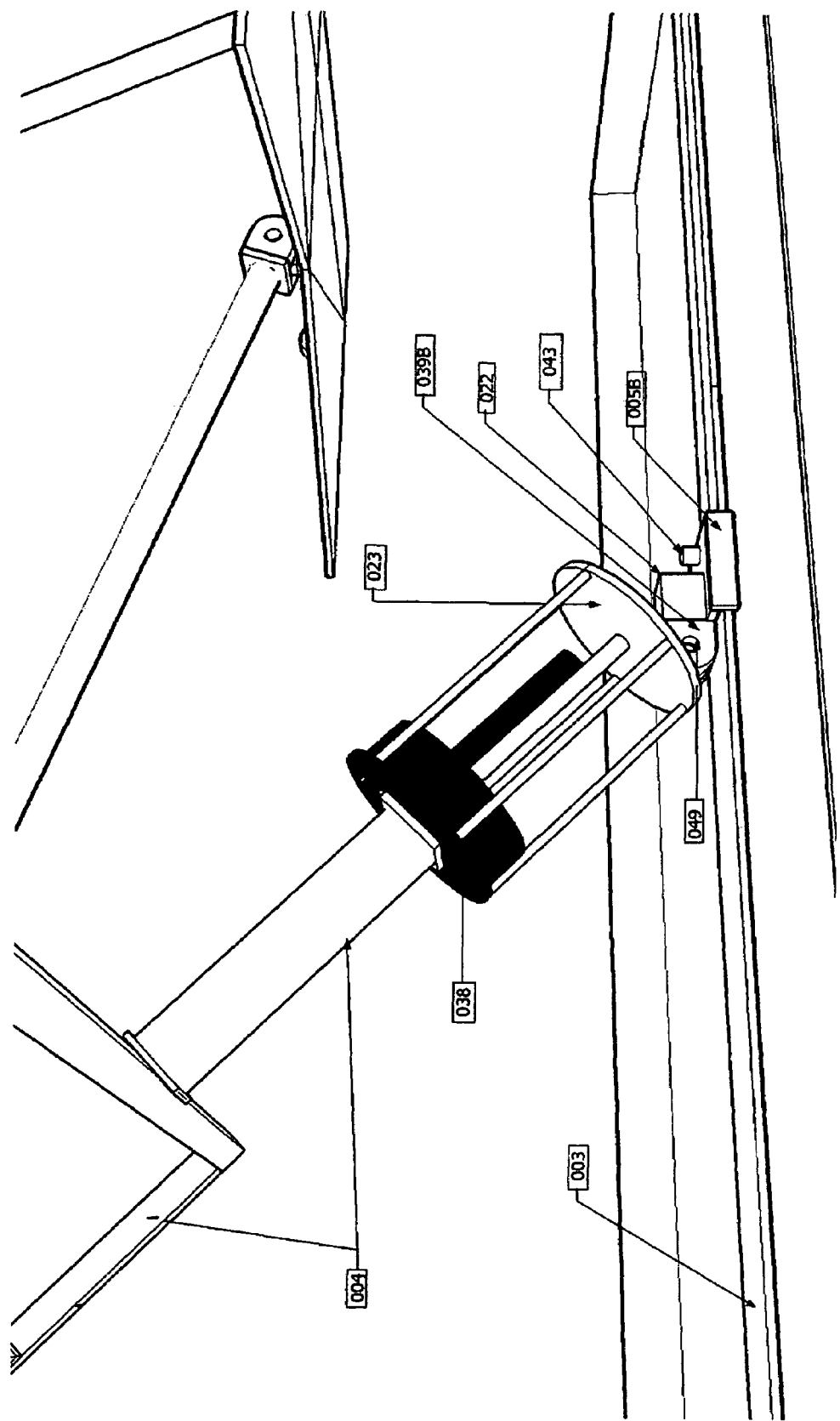
FIGURE 3 close-up of the roll/yaw frame – lower portion – the motor assembly

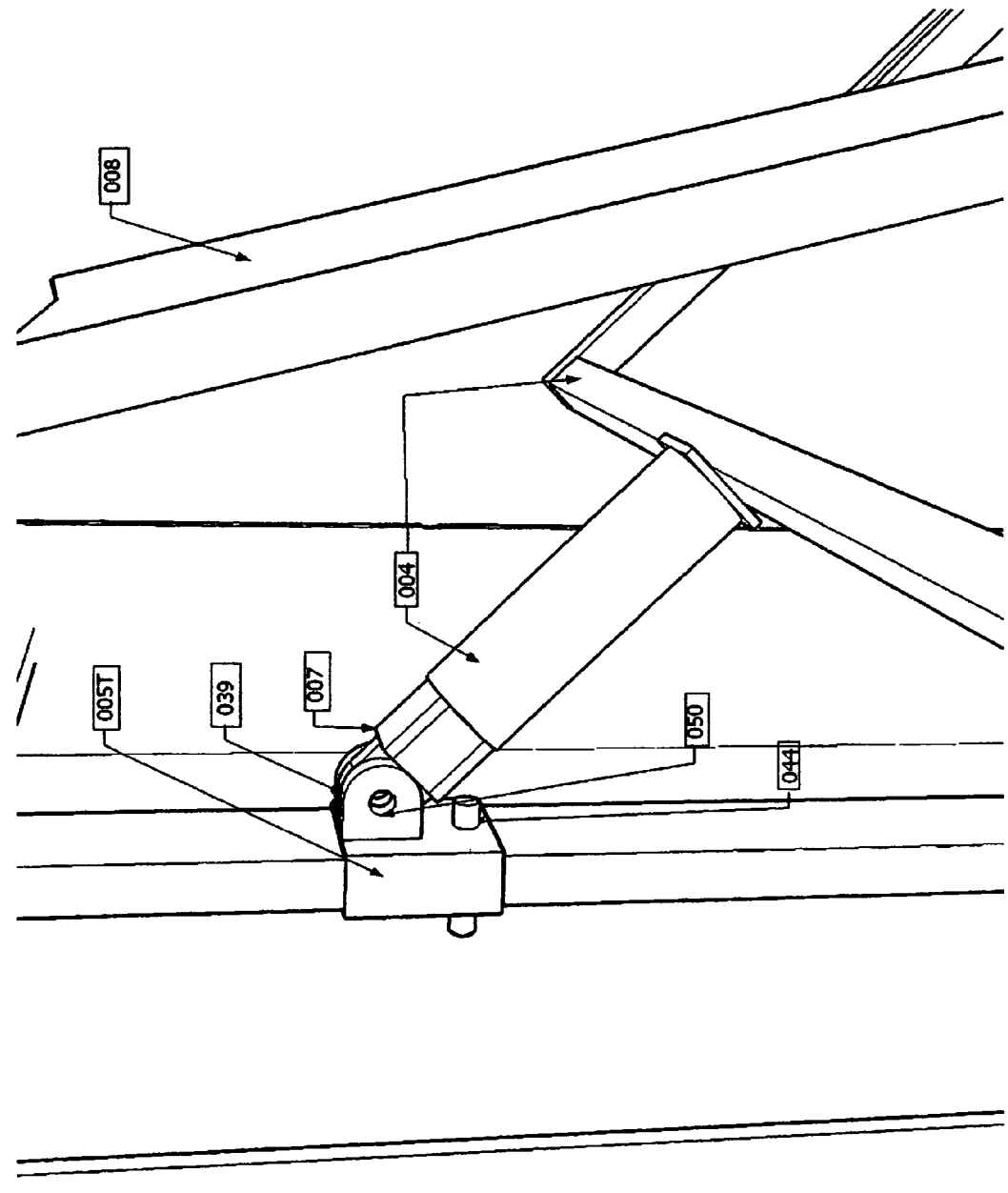
FIGURE 4 close-up of the roll/yaw frame – upper portion – the vertical slide, bushing (or bearing) and housing

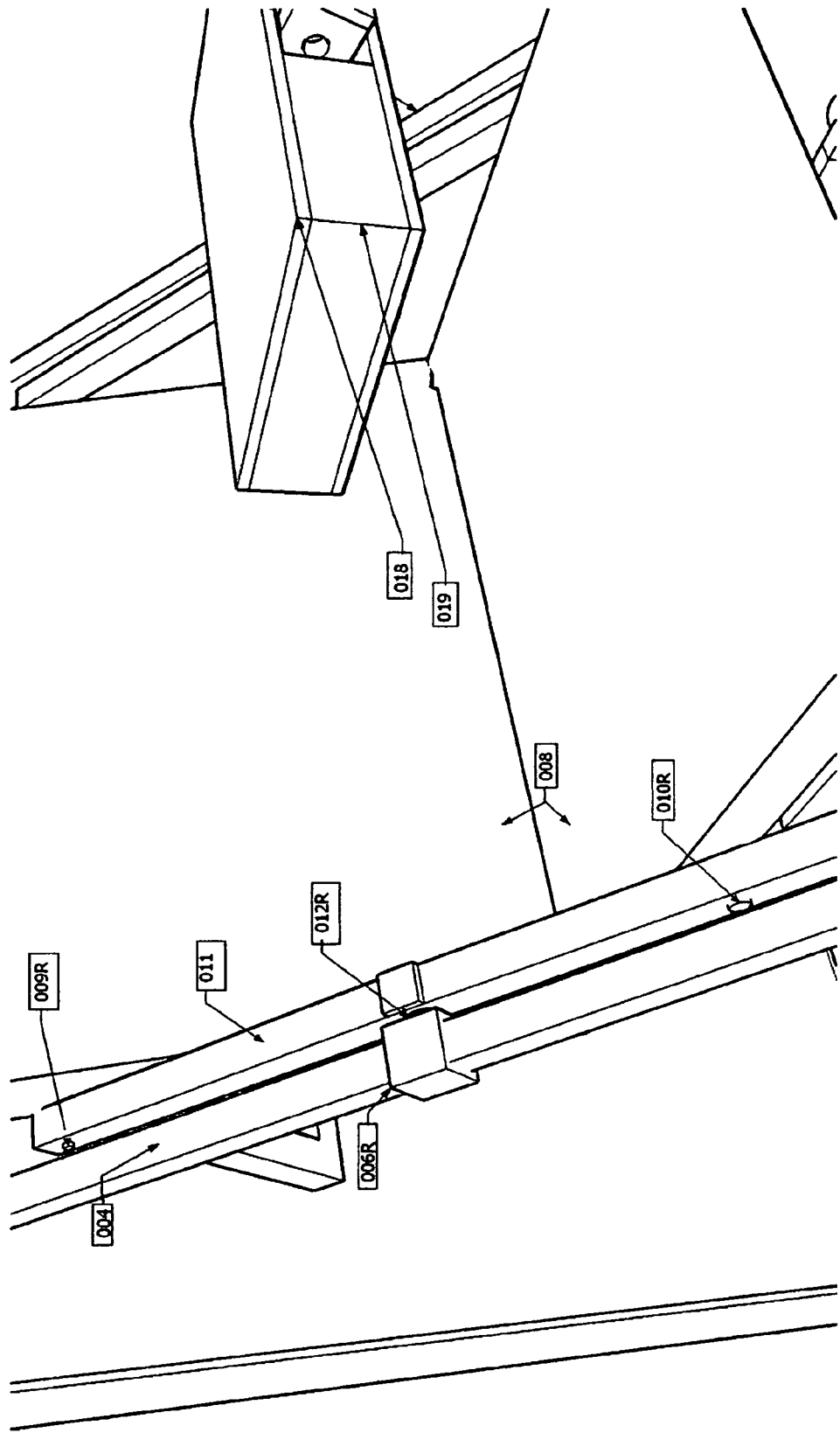

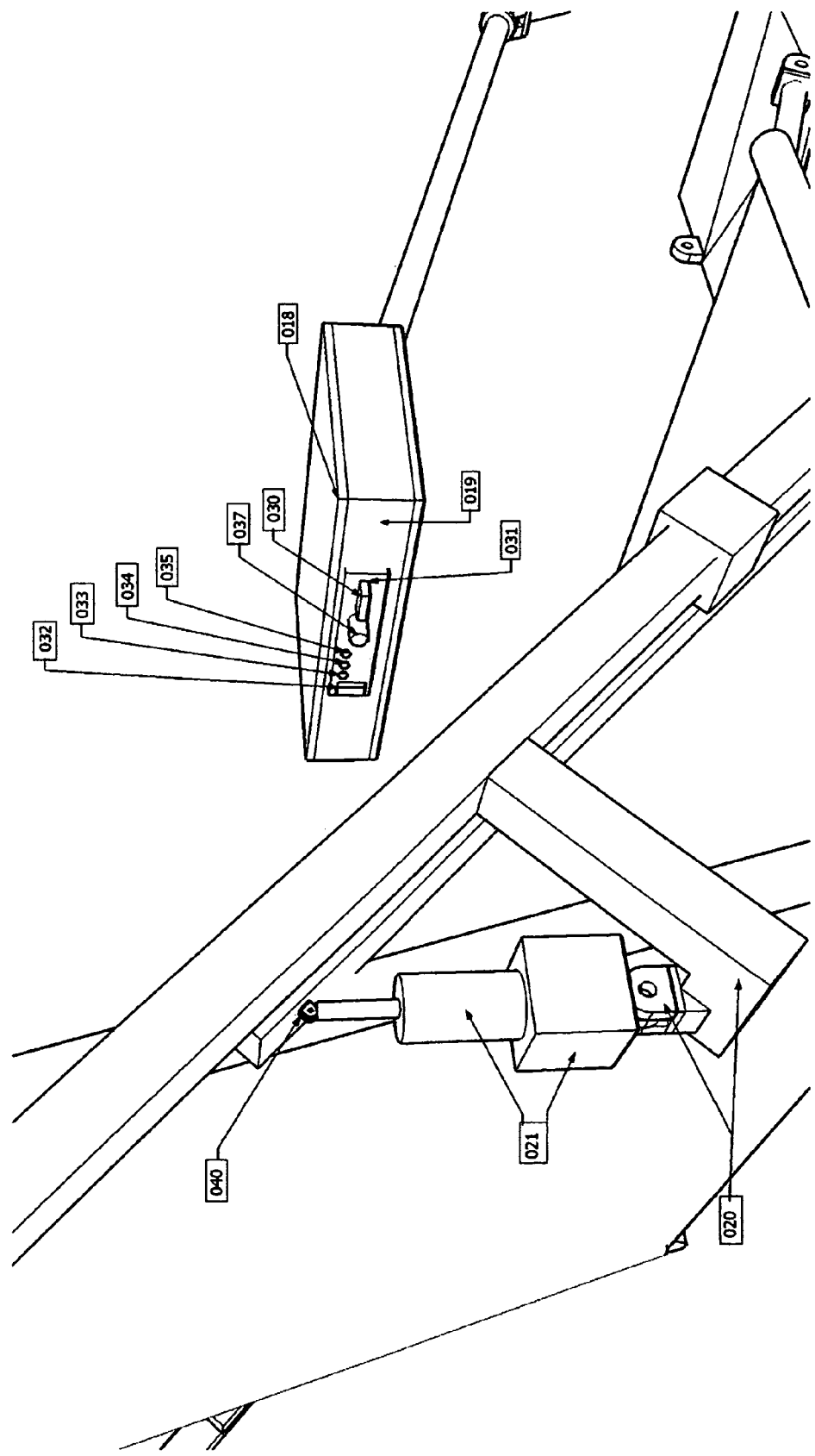
FIGURE 6 close-up of Pitch axis actuator and switch box

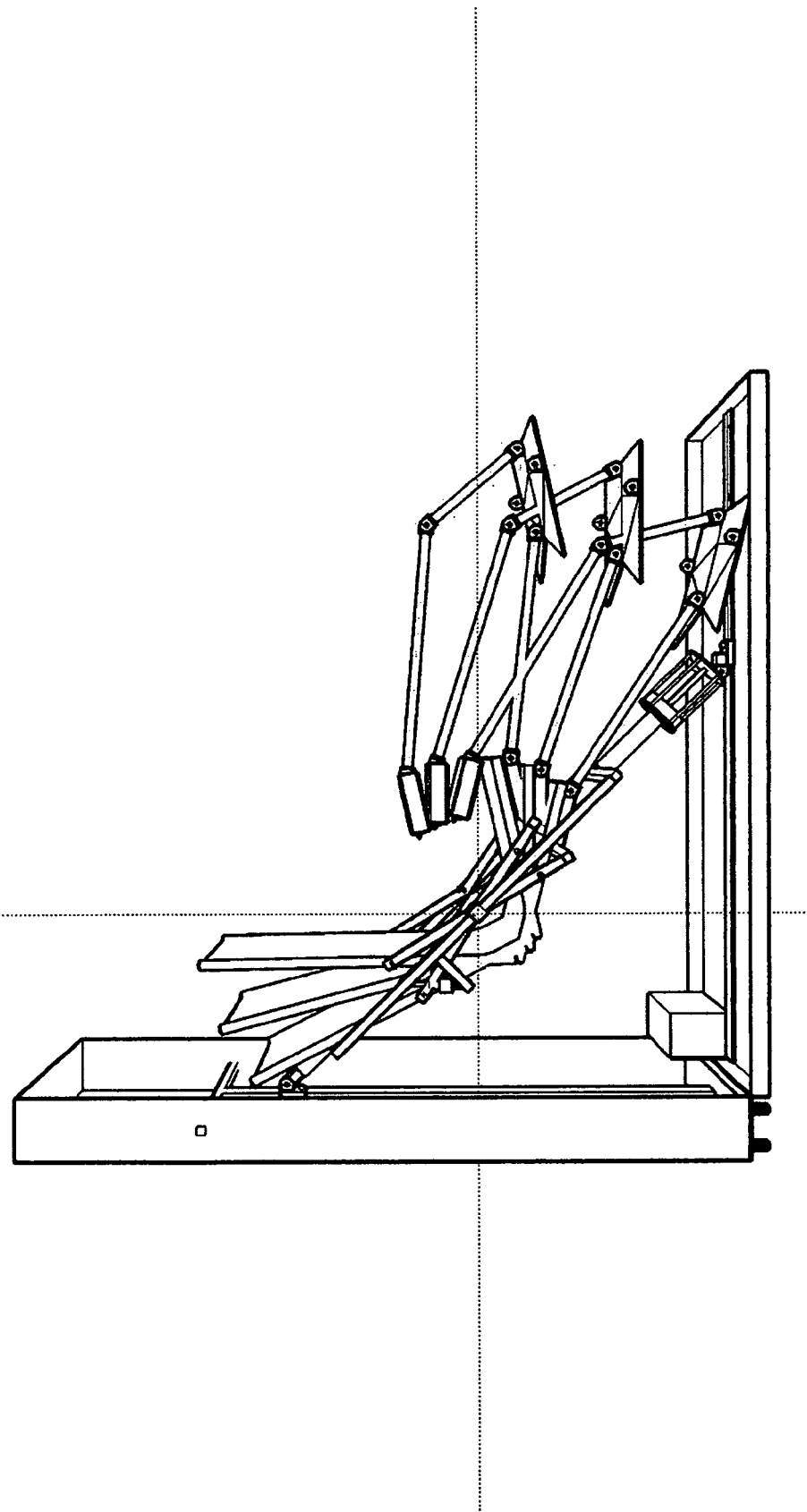
FIGURE 7 pitch axis – range of motion

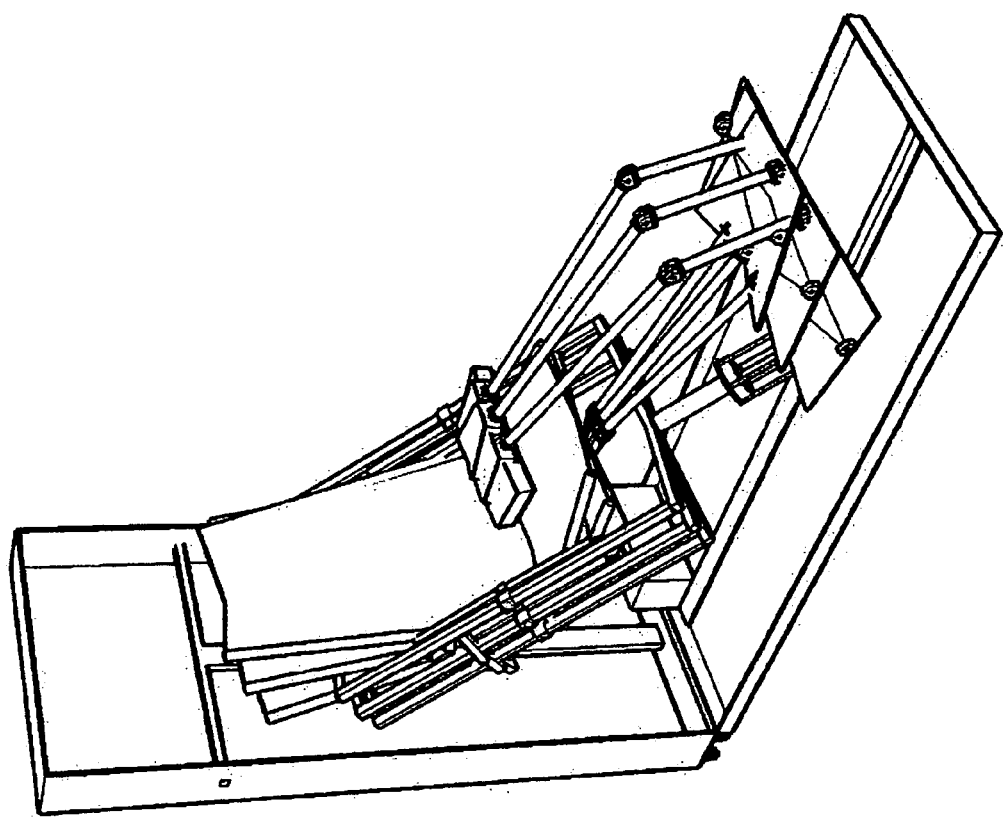
FIGURE 8 roll/yaw axis – range of motion

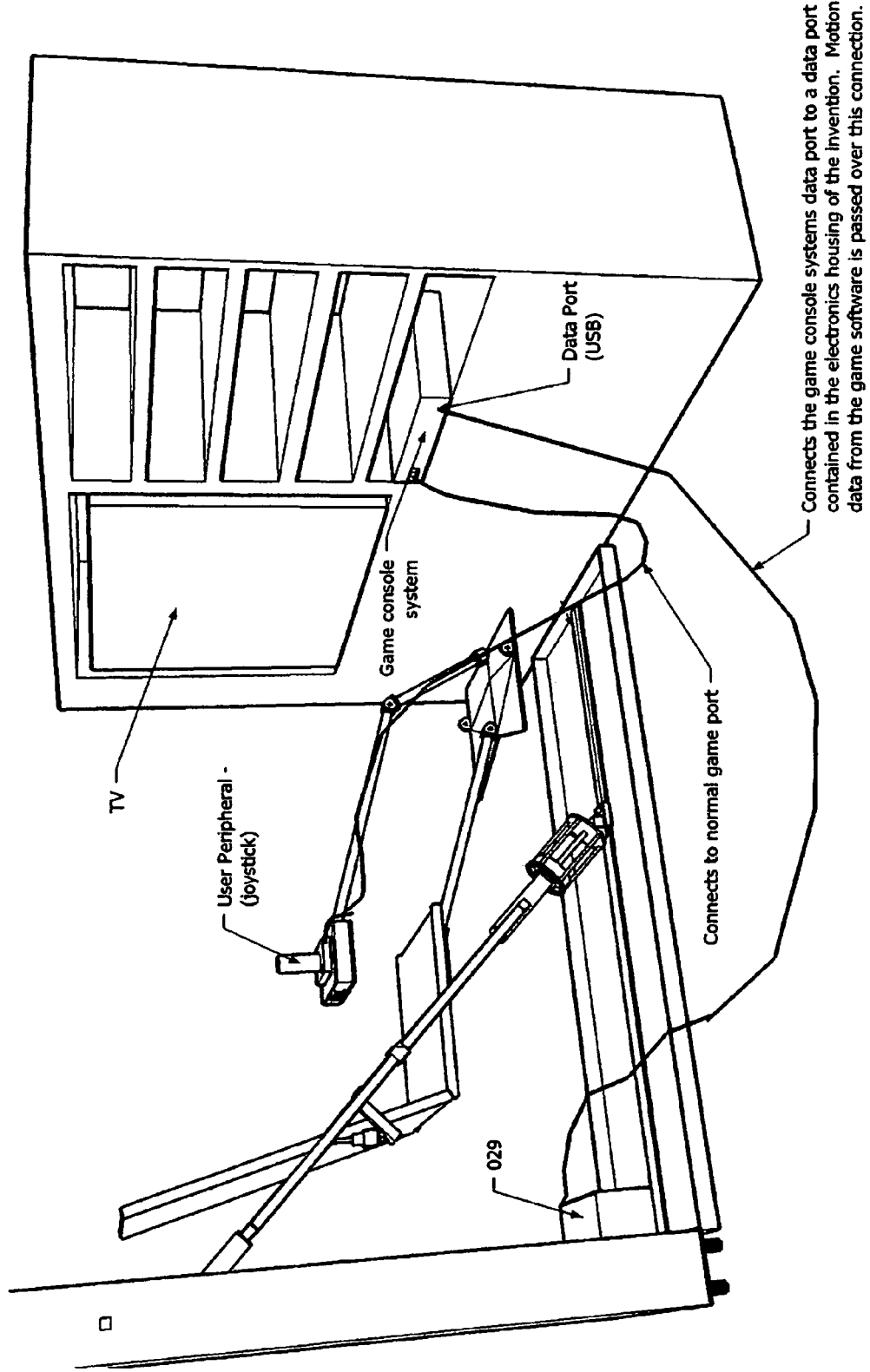
FIGURE 9 illustrates connecting the invention to the game console

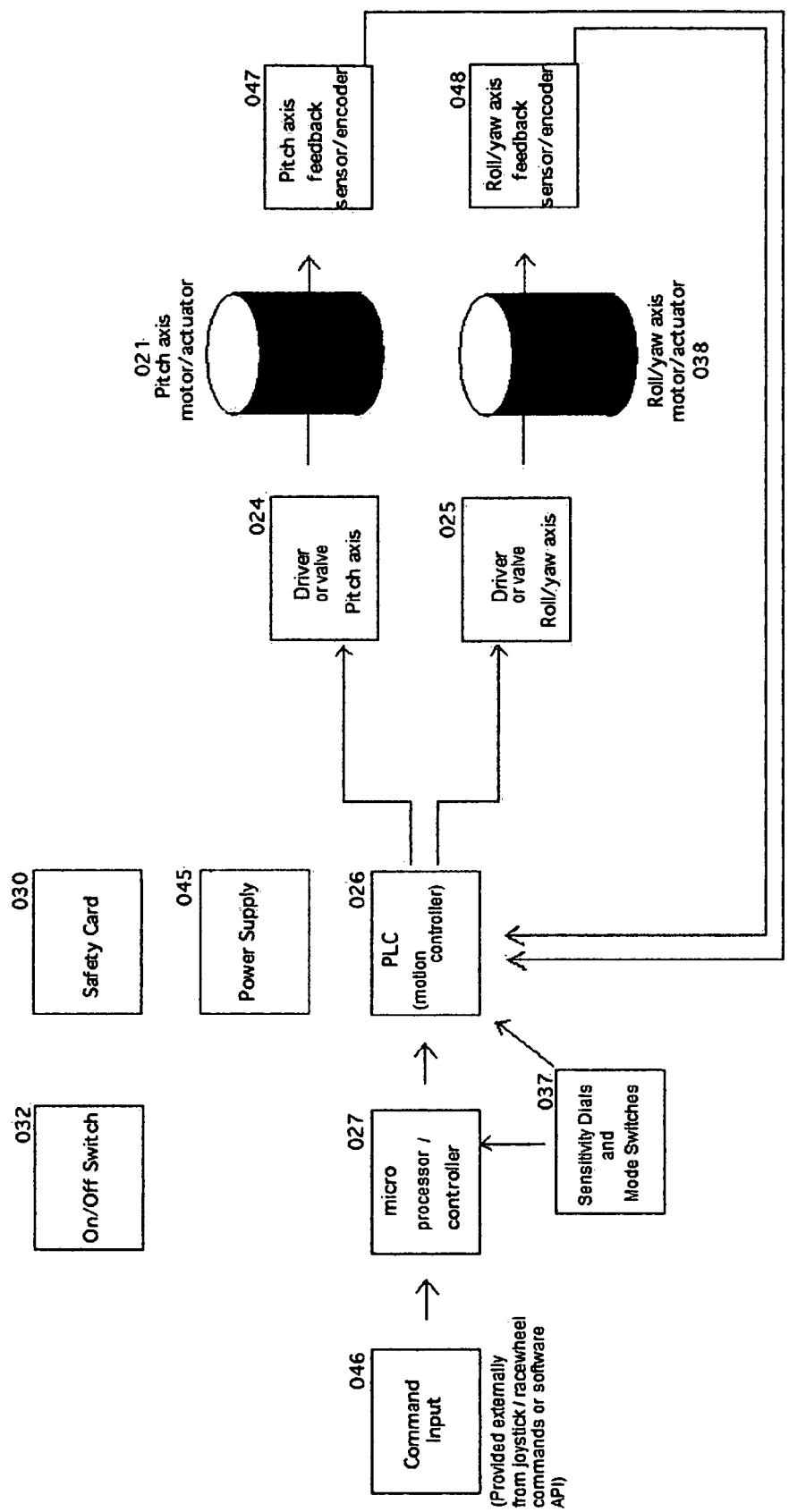
FIGURE 10 illustrates flow chart of command processing

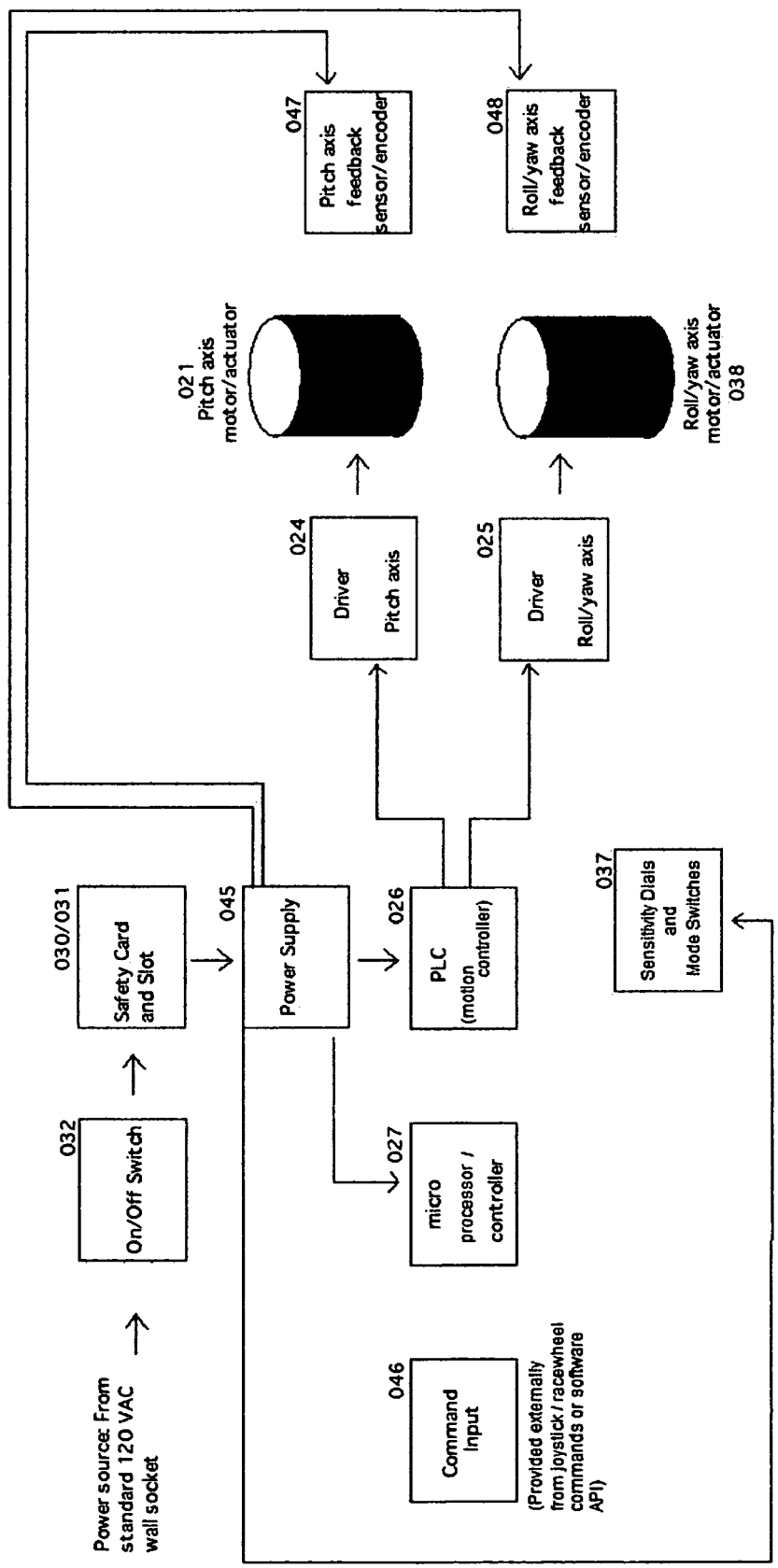
FIGURE 11 illustrates electrical power flow

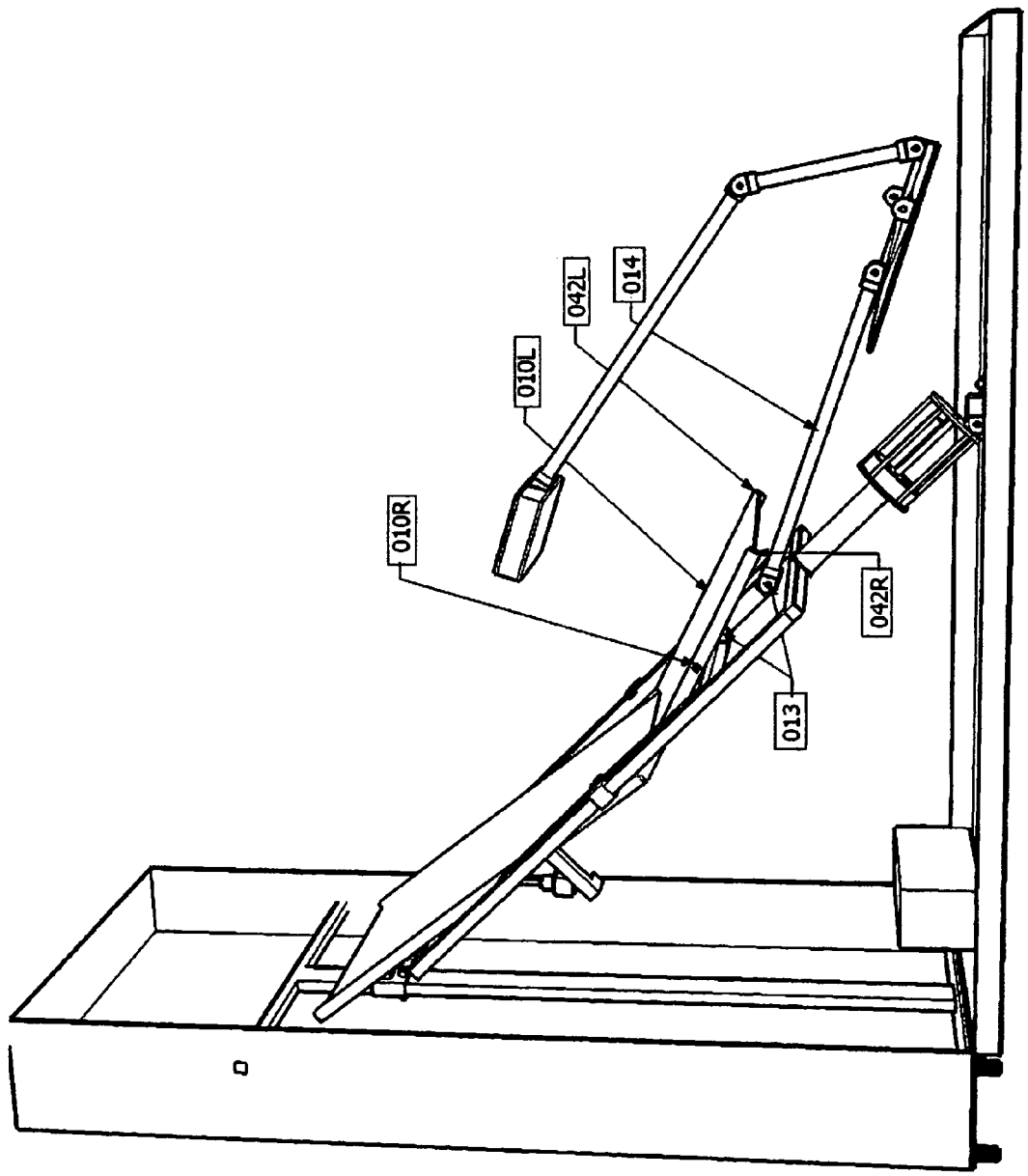
FIGURE 12 illustrates frames folding down stage 1 (seat folding)

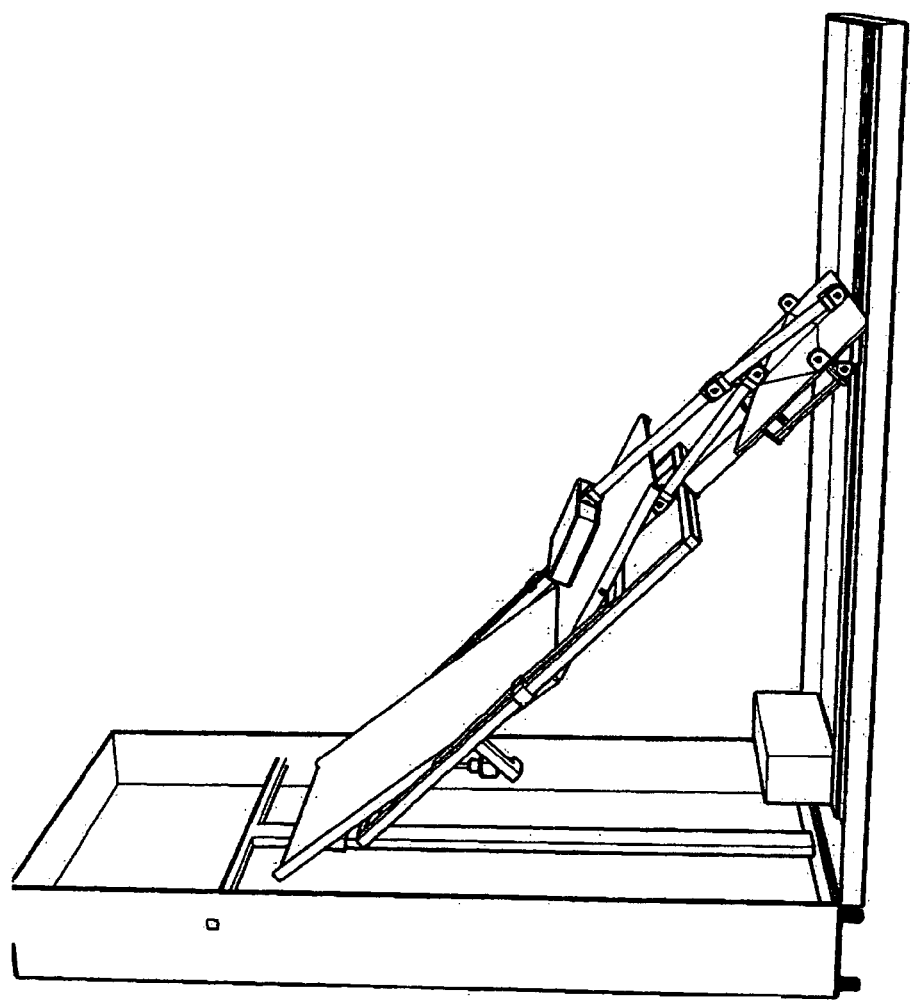
FIGURE 13 illustrates frames folding down stage 2 (frames sliding down)

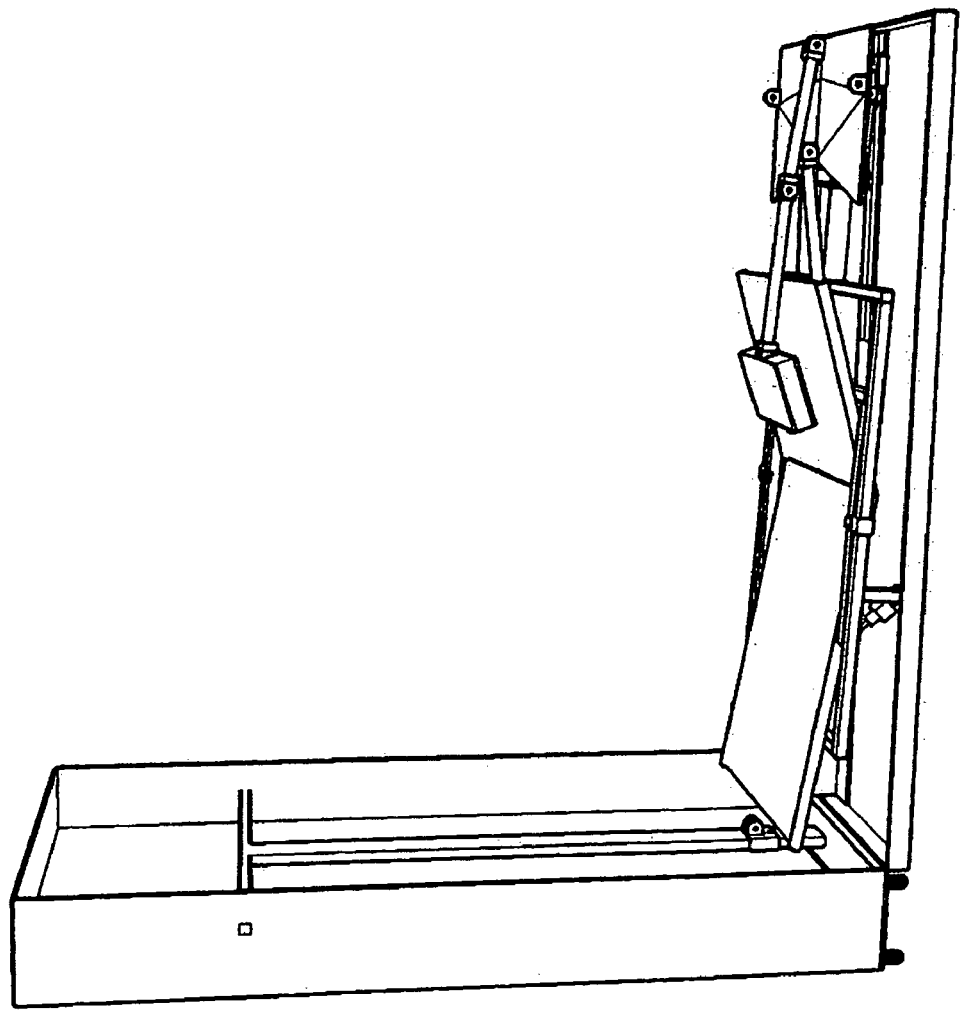
FIGURE 14 illustrates frames folding down stage 3 (frames all the way to rest state)

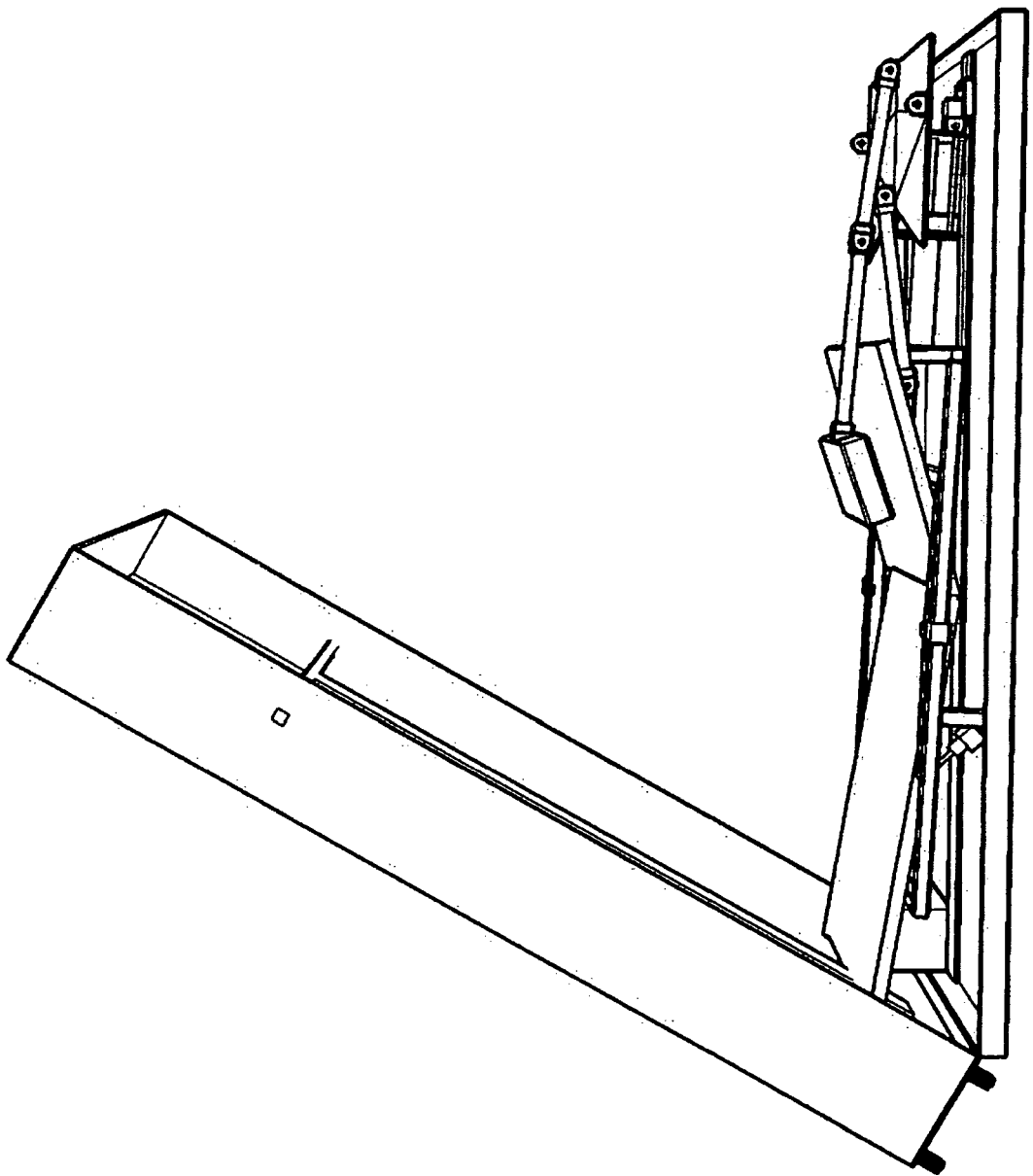
FIGURE 15 illustrates the enclosure case closing in an embodiment with an enclosure case.

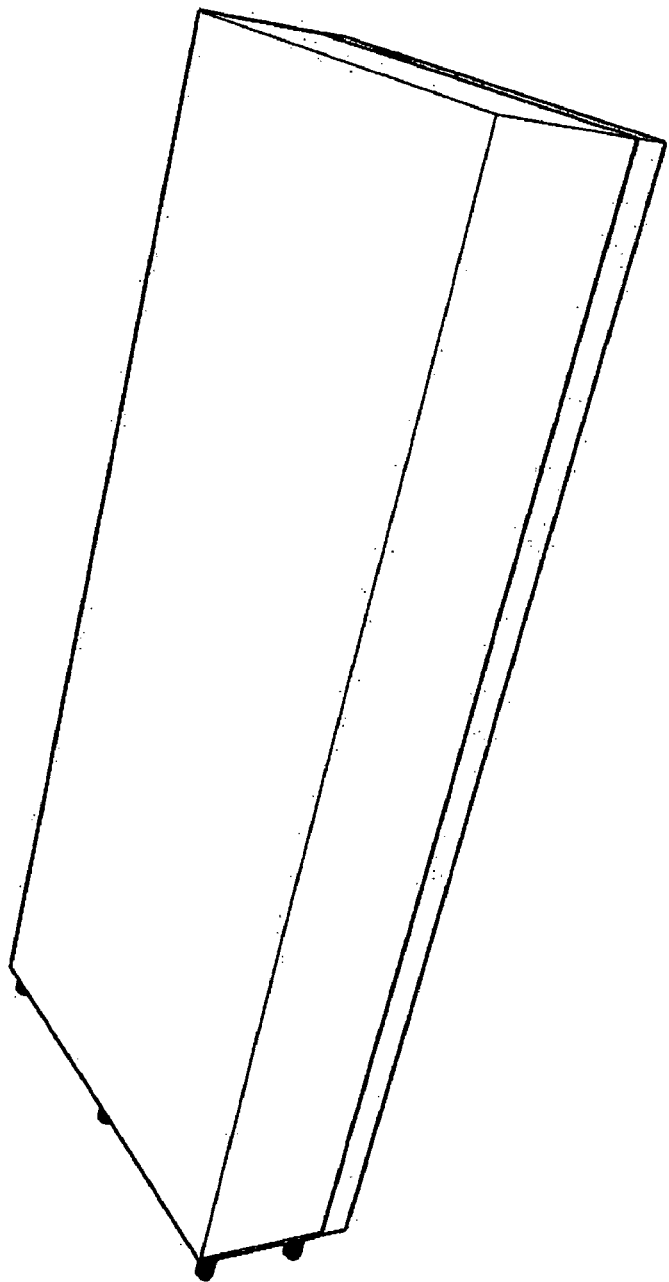
FIGURE 16 illustrates the enclosure case closed and ready for storage

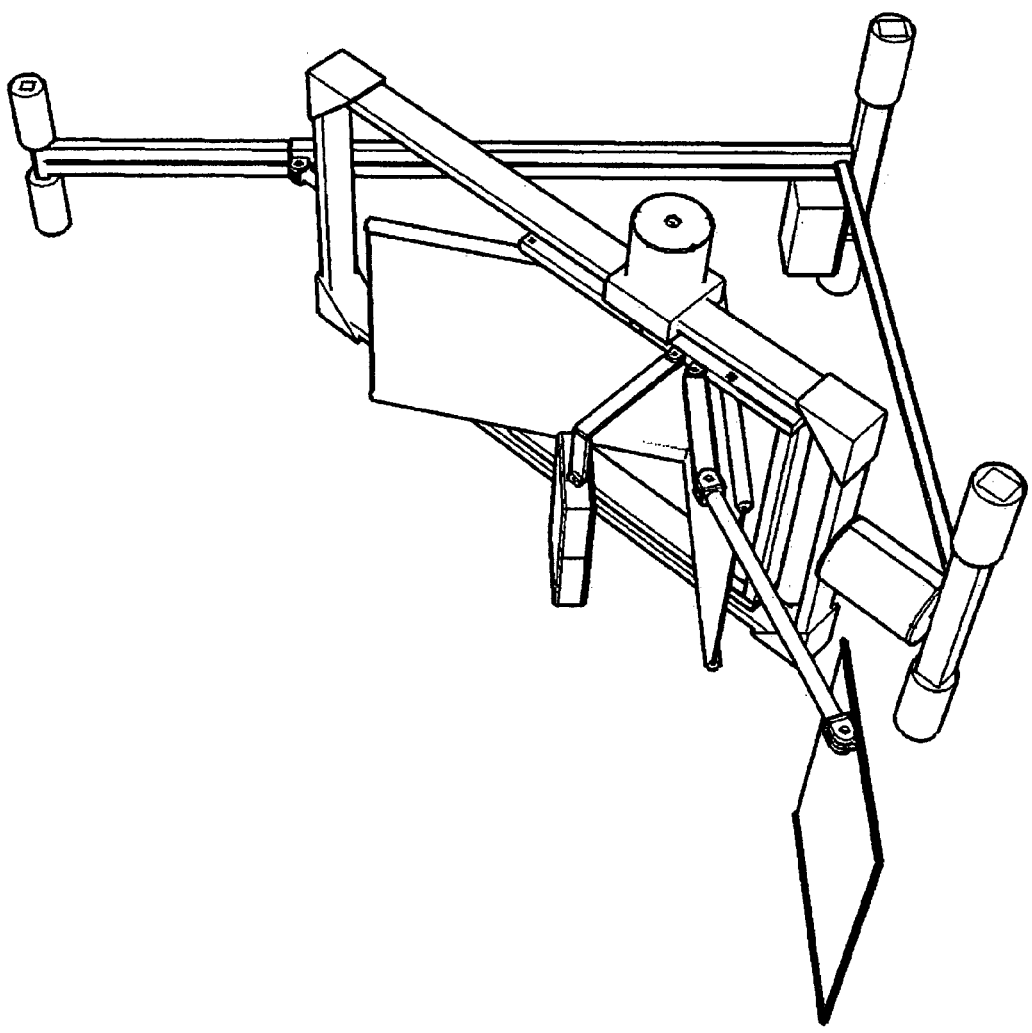
FIGURE 17 illustrates another embodiment of a collapsible motion platform without an enclosure case, requiring no disassembly for collapsibility, and containing rotary actuators for platform actuation.

COLLAPSIBLE MOTION PLATFORM

CROSS-REFERENCE TO RELATED APPLICATIONS

This patent application is a U.S. Non-provisional application filed pursuant to Title 35, U.S.C. §§100 et seq. and 37 C.F.R. §1.53(b), and claiming priority under Title 35, U.S.C. §119(e) to a U.S. Provisional application bearing Application No. 60/606,652, filed Sep. 2, 2004, and entitled "Collapsible Motion Platform," which is incorporated herein by reference.

BACKGROUND

1. Technical Field

The invention relates to a motion platform or simulator set-up, specifically to a collapsible and portable, single or multi-occupant motion platform system for use in the motion enhancement of simulation, virtual reality, and video game play.

2. Description of Related Art

A motion platform can also be referred to as a motion base, motion plate, motion seat, simulator and/or other names not listed herein. The primary function of a motion platform is to provide motion/movement to one or more users/riders/occupants. This movement can be created through a motion control system devised of either pneumatic, hydraulic, electromechanical, or electromagnetic actuators, and can be initiated to respond to user and/or software conceived motion commands. Motion commands can be created and coordinated in an effort to allow an occupant of a motion platform to move in response to an external input and synchronized with external output or medium. A motion platform can also be described as a device used in entertainment and simulation training whereby one or more occupants are moved about one or more degrees of freedom, (up to 6 total degrees of freedom), in synchronization with audial and video stimulus.

Motion is a necessary and sometimes critical component of a simulator because it affects the realism of the simulation. Motion platforms previously disclosed have spanned a broad spectrum in scale and cost. Those in the category of amusement park rides and commercial and military aircraft simulators are at the high end of this spectrum with arcade style amusement devices falling into the middle of the spectrum while home based motion platforms comprise the lower, affordable, end.

Historically, the high-end motion platform has been used in conjunction with military and commercial flight instruction and training applications. However, today you will find multiple occupant entertainment applications in theme parks throughout the world. The systems used in these applications are very large, weighing several tons typically located outdoors or are housed in facilities designed expressly for them. As a result of the force required to move the weight of these larger simulator systems and one or more occupants, the motion platform must be controlled by expensive hydraulic or electromagnetic cylinders. The cost of this type of motion platform usually exceeds $250,000 US dollars, and in some cases much more. The complexity of these systems requires an extensive amount of programming and maintenance, which further extends the cost associated with this type of motion platform.

The middle of the spectrum includes a number of disclosures involving powered motion platforms aimed at arcade style amusement arrangements. Typically the space requirements for such a platform are modest requiring only a portion of an arcade room and the motion is provided via similar, less expensive versions, of the high end motion systems.

While the available motion platform systems today were devised to provide a realistic motion platform system, the existing designs have drawbacks which limit their utility and acceptance in the home. Although the cost and size of these developed systems was an improvement over the large scale military and theme park sized motion platforms, the acceptance and use of the motion platform within the home is still limited due to cost and size issues. To date, existing systems have not appropriately answered these problems with innovation or invention.

SUMMARY OF THE INVENTION

The following summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows.

Certain illustrative example apparatuses, methods, systems, processes, and the like, are described herein in connection with the following description and the accompanying drawing figures. These examples represent but a few of the various ways in which the principles supporting the apparatuses, methods, systems, processes, and the like, may be employed and thus are intended to include equivalents. Other advantaged and novel features may become apparent from the detailed description which follows, when considered in conjunction with the drawing figures.

The above and other needs are met by the present invention which provides a motion platform which is collapsible and portable, and therefore convenient for storage. The present invention also allows for low-force actuation because it uses a load bearing support framework comprised of rotary frames and support frames which hold the rotary frames in position at their end, and rotational, points balancing the load at the center of mass. The actuators are required to perform less work in the form of linear force or rotational torque, due to the supported and balanced load. A pitch rotary frame is positioned inside a roll/yaw rotary frame and each of the rotary frames are supported with two shafts. The shafts cantilever the load of the seat, the occupant, and the occupant controls at the end points of the respective degrees of freedom within the load-bearing ball bearings or lubricated bushings of each rotary frame and at the center of mass. The roll/yaw rotary frame allows for an angular rotational plane, a combination of roll and yaw degrees of freedom, and provides conveniences in mounting and dismounting the platform, and frame collapsibility. A user peripheral tray, with various adjustable positions in front of the occupant of the motion platform allows for mounting of the user's input control peripheral, and the mounting of a switch box containing a control panel for the motion platform. The control panel contains various controls and indicators that power and reset the motion platform, control range of motion, acceleration, and direction for each of the degrees of freedom in realtime during gameplay. The control panel also provides status and informational indication through various LEDs, allows a safety key card feature designed like those found on modern treadmills for emergency stoppage, and allow the user to specify the source of motion commands. The motion platform can receive motion commands from either the user peripheral directly utilizing a data broadcaster/splitter to supply the user controller input signals to the game system and the motion platform simultaneously or from a software API source embedded in the game software designed to supply motion cueing through an output port on the gaming hardware, and to an input port within the electronics of the motion platform. The motion platform can be fitted with an enclosure case for protection if desired and may also include a mechanism for opening and collapsing the assembly without any manual or human effort. The motion platform is designed to be used with immersive display systems such as "virtual reality" goggles, glasses or helmets but could also be used with a separate external display, or fitted with a mounting for a LCD.

These and other objects are accomplished by the present invention and will become apparent from the following detailed description of a preferred embodiment in conjunction with the accompanying drawings in which like numerals designate like elements.

BRIEF DESCRIPTION OF THE DRAWINGS

The invention will be more readily understood by reference to the following description, taken with the accompanying drawing figures, in which:

FIG. 1 illustrates the left-side elevation of one embodiment of a collapsible and portable motion platform with an enclosure case.

FIG. 2 illustrates the front elevation view of one embodiment of a collapsible and portable motion platform with an enclosure case.

FIG. 3 illustrates a close-up of the lower portion of the roll/yaw rotary frame and the motor assembly of one embodiment of a collapsible motion platform.

FIG. 4 illustrates a close-up of the upper portion of the roll/yaw rotary frame the vertical slide, and the top bushing (or bearing) and housing of one embodiment of a collapsible motion platform.

FIG. 5 illustrates a close-up of the pitch and roll/yaw rotary frames in one embodiment of a collapsible motion platform.

FIG. 6 illustrates a close-up of the Pitch axis actuator and the switch box and control panel located under the peripheral tray in one embodiment of a collapsible motion platform.

FIG. 7 illustrates the range of motion for the pitch axis in one embodiment of a collapsible motion platform.

FIG. 8 illustrates the range of motion for the roll/yaw axis in one embodiment of a collapsible motion platform.

FIG. 9 illustrates the hookup of the controller, game console, and one embodiment of the present invention platform.

FIG. 10 illustrates a flow chart of command processing of one embodiment of the present invention.

FIG. 11 illustrates a flow chart of the electrical power flow of one embodiment of a collapsible motion platform.

FIG. 12 illustrates folding down/collapsing stage 1 (seat folding) of one embodiment of a collapsible motion platform.

FIG. 13 illustrates folding down/collapsing stage 2 (foot and peripheral tray collapsing—support framework assembly and seat sliding down)—of one embodiment of a collapsible motion platform.

FIG. 14 illustrates folding down/collapsing stage 3 (support framework assembly, seat, and trays to compacted state) of one embodiment of a collapsible motion platform.

FIG. 15 illustrates the optional enclosure case closing of one embodiment of a collapsible motion platform.

FIG. 16 illustrates the optional enclosure case closed of one embodiment of a collapsible motion platform.

FIG. 17 illustrates another embodiment of a collapsible motion platform without an enclosure case, requiring no disassembly for collapsibility, and containing rotary actuators for platform actuation.

DETAILED DESCRIPTION

Certain illustrative and exemplary apparatuses, systems, and methods are described herein in connection with the following description and the accompanying drawing figures. The examples discussed represent only a few of the various ways of applying the principles supporting the material disclosed and, thus, the examples are intended to include equivalents. Other advantages and novel features may become apparent from the detailed description which follows, when considered in conjunction with the drawing figures, in which like numerals indicate like elements throughout the several views.

Definitions

As used in this application, the terms "collapsible" or "collapsibility" refer to the ability to fold down into a compacted dimension—or into a smaller size and shape—allowing for convenience of transport and storage. A "collapsible" assembly also refers to being expanded from a smaller, more compact size, into a ready-to-use state. In other words an assembly which can be collapsed from a ready to use and open state or position, to a storage and closed state or position and vice-versa. Collapsibility is sometimes achieved by hinged members.

As used in this application, the term "portable" refers to something that is able to be carried or moved without special assistance from devices or persons. Typically, something which can be transported over a distance by one average sized person with relative ease.

As used in this application, the term "actuator" refers to a device that is capable of creating linear movement with a measured force of stroke, or a device that is capable of creating rotation movement with a measured torque of rotation. The actuator device power may be derived from air pressure, fluid pressure, electric current, or magnetic force.

As used in this application, the term "actuation" refers to an object being moved on at least one degree of freedom through the use of an actuator.

As used in this application, the term "roll" refers to the roll degree of freedom and can be described as a rotational degree of freedom along the x-axis, (a horizontal plane or 0 degrees of incline), with the position of the endpoints of the roll axis being positioned in front of and behind the occupant. Travel about the roll axis exhibits a sensation of tilting left or right.

As used in this application, the term "yaw" refers to the yaw degree of freedom and can be described as a rotational degree of freedom along the z-axis, (a vertical plane or 90 degrees of incline), with the position of the endpoints of the yaw axis positioned above and below the occupant. Travel about the yaw axis exhibits a sensation of rotation as if sitting in a typical rotating desk chair.

As used in this application, the term "roll/yaw" refers to any combination of the x (Roll) and z (Yaw) axises that is used as a rotational degree of freedom—the x-axis as a horizontal plane and the z-axis as a vertical plane are combined into a variable angular plane which falls in between 1 and 89 degrees of incline. Travel about the Roll/Yaw axis exhibits sensations of a tilt left or right about the roll axis with a slight sensation of rotation about the yaw axis. Rotation about the roll/yaw degree of freedom varies with the position of the degree of freedom end points. The position of the endpoints of the roll/yaw axis vary depending on the amount of inclination. The roll/yaw axis can be accomplished by a rotary frame assembly rotatable around a roll/yaw axis wherein the angle between the roll/yaw frame assembly and the horizontal plane is between 1 degrees to 89 degrees. The motion platform 100 describes a 45 degree incline for a roll/yaw axis. Realtime variation in the angle of incline for the roll/yaw axis can be used to simulate a heave degree of freedom.

As used in this application, the term "pitch" refers to the pitch degree of freedom and can be described as a rotational degree of freedom along the y-axis, (a horizontal plane or 0 degrees of incline), with the position of the endpoints of the pitch axis being positioned to the left and right of the occupant, travel about the pitch axis exhibits a sensation of tilting forward and backward.

As used in this application, the term "heave" refers to the heave degree of freedom and can be described as a linear degree of freedom on which travel exhibits a sensation of moving up and down. As the inclination of the roll/yaw axis changes, the sensation of moving up and down is felt and the heave degree of freedom is simulated.

As used in this application, the term "surge" can be described as a linear, or translational, degree of freedom on which travel exhibits a sensation of moving forward and backward.

As used in this application, the term "sway" can be described as a linear, or translational, degree of freedom on which travel exhibits a sensation of moving side to side, left to right or right to left.

As used in this application, the term "telemetry" refers to and can be described as a highly automated communications process by which measurements are made and other data collected at remote or other inaccessible points and transmitted to receiving equipment for monitoring, display, recording, or response. Traditionally, telemetry data has been sent over wires, but modern telemetry more commonly uses radio transmission. Telemetry applied to a video gaming, simulation, or virtual reality application can include an automated data measurement and gathering process which can then be transmitted to an external device, (ex. motion platform 100) for use in video display, audio playback, or motion response. As applied to the motion platform 100, the data collected in a video game application could include the speed, acceleration, altitude, and attitude data of an aircraft and can then be used to create the appropriate motion response. The telemetry data which could be used for the creation of motion command signals for the motion platform 100 may be transmitted over a wireless radio transmission to a radio signal receiver component of the motion platform 100.

As used in this application, the terms "peripheral", "user peripheral", "user input peripheral" or "user controller" refer to the user input device for the game system. Examples of peripherals include joysticks, controller (D) pads, steering wheels, flight yokes, control foot boards, foot pedals, trackballs, and handlebars.

As used in this application, the terms "user" and "occupant" refer to a person who is actively using the invention.

As used in this application, the terms "case" or "enclosure" or "enclosure case" refer to something that encloses and is generally applied to supply protection and/or concealment.

As used in this application, the term "rotary frame" refers to an assembly comprised of one or more frame members, cantilever shafts, bearings (or bushings), and/or other assemblies, designed to both bear a balanced load and rotate about one rotational degree of freedom. Rotational motion about a degree of freedom is attained as the frame assembly and shafts rotate within the bearings or lubricated bushings that are supporting the balanced load and which are affixed to one or more assemblies other than the rotary frame itself.

As used in this application, the term "support frame" refers to a frame member designed to hold up a frame, a member, or an assembly of frames and members, and the accompanying load of said frame, member, or assembly, at one or more fixed points. An example cited within this application relates a support frame as the member used as the mounting for one or both end points of a rotary frame.

As used in this application, the term "support framework" refers to the combination of one or more rotary frames and one or more support frames designed and constructed in order to support a load, generally at equilibrium. The balancing of the load includes the calculation of the center of gravity, or center of mass, and may rely on a pendulum property. The pendulum property allows the Earth's gravity to always restore the load inside the support framework to equilibrium—sometimes described as the "home" or "rest" position. Such a configuration allows for minimal actuation, low force or low torque, to move the load about the degrees of freedom.

As used in this application, the term "computer component" refers to a computer-related entity, such as hardware, firmware, software, a combination thereof, or software in execution. For example, a computer component can be, but is not limited to being, a process running on a processor, a processor itself, an object, an executable, a thread of execution, a program, and a computer. By way of illustration, both an application running on a server and the server itself can be a computer component. One or more computer components can reside within a process and/or thread of execution and a computer component can be localized on a single computer and/or distributed between and among two or more computers.

As used in this application, the terms "switch box" and "control panel" refer to a series of user input controls, in the form of buttons, knobs, dials, switches, and levers, and a series of motion platform status output indication devices, including LEDs or an LCD screen. Generally speaking, the control panel is used for user control, input and calibration of the motion platform, and output from the motion platform to the user.

Introduction

Exemplary systems, methods, and apparatuses are now described with reference to the drawing figures, where like reference numerals are used to refer to like elements throughout the several views. In the following description, for purposes of explanation, numerous specific details are set forth in order to facilitate a thorough understanding of the systems, methods, apparatuses, and the like. It may be evident, however, that the exemplars described may be practiced without these specific details. In other instances, common structures and devices are shown in block diagram form in order to simplify the description.

Many modifications and other embodiments may come to mind to one skilled in the art who has the benefit of the teachings presented in the description and drawings. It should be understood, therefore, that the invention is not be limited to the specific embodiments disclosed and that modifications and alternative embodiments are intended to be included within the scope of the disclosure and the exemplary inventive concepts. Although specific terms may be used herein, they are used in a generic and descriptive sense only and not for purposes of limitation.

In the description that follows, one embodiment of the present invention is described in detail. Other embodiments of the invention will be apparent to those skilled in the art from consideration of the specification and practice of the invention disclosed herein.

The present invention is a collapsible, and portable motion platform that will interface with a personal computer (PC), video game console devices, simulator and virtual reality systems. The motion platform can have one, two, three, four, five, or six degrees of freedom, (roll, yaw, pitch, heave, surge, sway, or a combination of roll and yaw) and can be controlled by a variety of motion control components, controls, and technologies in electromechanics, pneumatics, hydraulics, or electromagnetics. The motion platform can include one or more foldable seats positioned in one or more rotary frames and upheld by one or more support frames creating a collapsible support framework and seat assembly. Other required components of the motion platform include one or more devices used for rotary or linear actuation and at least one motion command signal. A series of user controls that can regulate the range, acceleration, and direction of motion for each of the degrees of freedom are all desired elements of the invention but not required to create a collapsible motion platform. The invention would be advantageously used in conjunction with video games, simulators and virtual reality systems. The motion platform could be used in other applications such as military or flight instruction applications.

The motion platform disclosed herein is a collapsible, portable, lightweight, and inexpensive motion platform that may be advantageously used in the home. The motion platform can be placed temporarily in any room, wherever a gaming, simulation, or virtual reality system is located. When the system is not in use it may be collapsed and optionally concealed into an enclosure, moved easily, and stored. A software API integrated into any game or simulation software can provide the required motion commands or the platform can be actuated based on user controller input signals. The collapsible motion platform enables one or more users to experience the physical sensory enhancement and realistic feel of their video game playing, simulation, and virtual reality experiences while posing as a conveniently portable and unobtrusive device in the home or wherever space is limited, or collapsibility and portability are convenient or desired.

FIG. 1 depicts a collapsible and portable motion platform 100 that allows one or more occupants to experience motion simulation in conjunction with their existing game consoles, personal computer gaming systems, simulation and virtual reality systems and accompanying audio, video, and control devices. Motion platform 100 is designed to be especially advantageous for use in the home however motion platform 100 could also be used in other applications (such as flight or military training) where space is at a premium and/or where collapsibility and portability are desirable. Motion platform 100 preferably has a relatively small size and weight. For the purposes of the motion platform 100, a weight that is less than one hundred pounds can be considered lightweight. The portablility of motion platform 100 may also be assisted by, but not solely accomplished by, the use of simple devices such as wheels and carrying handles.

With reference to FIG. 1, the right side elevation of one embodiment of the motion platform 100 is illustrated. This right side elevation shows one embodiment of a motion platform 100 being partly comprised of an enclosure case 001, the roll/yaw rotary frame 004, the pitch rotary frame 011, and a seat 008 In the motion platform 100, the optional enclosure is a case which allows for the protection of the motion platform 100.

It will be apparent to one skilled in the art that the motion platform 100 as shown in FIG. 1 provides 2, (two), degrees of freedom. As would be appreciated by one skilled in the art, other degrees of freedom can be incorporated into this embodiment to create a three, four, five, or six degrees of freedom motion platform that is still both collapsible and portable. An enclosure case 001 provides a convenient carrying case for the motion platform 100 when it is in its collapsed position. Motion platform 100, however, could also be constructed without an enclosure case 001 as depicted in FIG. 17.

A main vertical support frame 002 and a main horizontal support frame 003 provide for the two sliding tracks for the roll/yaw rotary frame 004 and pitch rotary frame 011 structures. It is by this sliding action and along these horizontal and vertical planes, that the motion platform 100 is collapsed for storage or expanded for usage. In order to expand or collapse the motion platform support framework, the roll/yaw rotary frame mount and top slider 005T and the roll/yaw rotary frame mount and bottom slider 005B, must be unlocked from their open position in order to allow for movement along these sliding planes. A lubricant may be used between the support frame mounts and the sliding planes to facilitate sliding. Alternatively, the support frame mounts may be fitted with sliding wheels and the support frames fitted with a sliding track like those seen in sliding glass door arrangements. The present embodiment and accompanying FIG. 1 illustrates both a top 043 and bottom 044 "locking pin" which is applied manually to lock the platform in a ready for use position on both the top 005T and bottom 005B sliding surfaces. The locking pins 043 and 044 are inserted in a hole in the mount which also passes through the applicable support frame. These pins can lock the rotary frame structures in place at a 45 degree angle or another desired angle within the roll/yaw degree of freedom. These locking pins are illustrated and described as manual and mechanical locking pins that prevent any linear rotary frame movement once the pins are in place. Alternatively, an electrically energized locking mechanism could be used that would allow for variations to the 45 degree angular plane or inclination, (1 to 89 degrees), of the roll/yaw rotary frame as the motion platform is in use providing a simulated heave degree of freedom.

The main vertical support frame 002 and the main horizontal support frame 003 serve as two parts of the motion platform's support framework. The support framework material and its withheld component framing material, (ex: seat, peripheral tray, foot tray), can be constructed of aluminum tubes, rods, shafts, and/or flatbar that allows for both durability, and portability. Aluminum is inherently lightweight, which makes it an attractive material for the support frame structure; however, the base material for this structure can be any rigid, sturdy material including but not limited to: metals, plastics, and many other natural or synthetic materials.

The roll/yaw rotary frame 004 rotates about the roll/yaw degree angular plane, in this embodiment at 45 degrees, supported by the horizontal 003 and vertical 002 support frames. As stated earlier, the inclination of the roll/ya rotary frame, and thus the roll/yaw axis may vary from between 1 to 89 degrees. A roll/yaw actuator housing 023 is located at the base of the roll/yaw frame 004. The roll/yaw actuator assembly and housing may be an "out-of-the-box" geared rotary actuator whose torque could be made possible by a DC stepper motor, an AC servo motor, fluid pressure, air pressure, or another means that can be electronically controlled. The required torque to rotate the roll/yaw rotary frame 004 is minimal because the upper end of the roll/yaw frame 004 rotates within a bearing (or bushing) 007 which supports a large portion of the total load.

The pitch rotary frame 011, shown in FIG. 5, rotates within the roll/yaw rotary frame 004 along the pitch rotational axis which runs through the center of gravity of the occupant who is positioned in the seat. Two bearings 006L and 006R, shown in FIG. 2 and FIG. 5, fixated within their own housings and embedded within the the roll/yaw rotary frame 004 serve as the pitch rotary frame mountings. The bearings 006L and 006R remain stationary while two ½ inch stainless steel pitch shafts 012L/012R, shown in FIG. 5 and fixed to the pitch rotary frame 011, are rotated within the bearings 006L and 006R. The pitch rotational axis is positioned close to or at the rider midsection when they are sitting in the seat. There may be a one to three inch gap, or greater, between the roll/yaw rotary frame 004 and the pitch rotary frame 011 on all sides which provides for safety clearance and helps to prevent the occupant's, or a bystander's, fingers from pinching. The pitch rotary frame rotates within the roll/yaw rotary frame when the pitch linear actuator 021 is stroked either up or down.

In this embodiment the pitch axis motor and linear actuator 021 is fixed to both the roll/yaw 004 and the pitch rotary frames 011. The base of the pitch axis motor and linear actuator 021 is attached to the pitch axis motor mount 020 which is fixed to the roll/yaw rotary frame 004. The top end of the rod of the pitch axis motor and linear actuator 021 is fixed to the pitch rotary frame 011. As the pitch linear actuator 021 is stroked in and out, the pitch rotary frame 011 rotates about the pitch rotational axis while the roll/yaw rotary frame 004 remains stationary. There is a equilibrium, or "home", point for the pitch axis motor and linear actuator 021. Since there are 30 degrees of total movement along the pitch degree of freedom, a half stroked pitch actuator 021 positions the seat 008 and occupant at the home position. In this embodiment, the total stroke of the pitch actuator 021 is 5 inches, at 2.5 inches of stroke is the home position for the motion platform's 100 pitch axis. As depicted in FIG. 17, other methods of actuation could be used to actuate the occupant along the pitch axis, such as a rotary actuator mounted between the pitch and roll/yaw rotary frames and positioned directed on the pitch axis.

Also pictured in FIG. 1 is the optional enclosure case 001. Illustrated here is a 80"×36"×9", rectangular, hard case made from ¼" plyboard, aluminum hardware, with recessed handles and wheels. It should be apparent to someone skilled in the art that there are other sizes, shapes, and materials that can be used to accomplish similar enclosures. As stated earlier, the motion platform 100 can be implemented without an enclosure case 101. (Reference FIG. 17 for an illustration of the motion platform 100 without an enclosure case.) It does however provide for a protective packaging for any motors, electronics, and frame structures of the motion platform 100.

The foot tray 015 as well as the peripheral tray 018 are also illustrated in FIG. 1. The foot tray 015 serves as the occupant's foot rest while the peripheral 018 tray is used as a platform or shelf for the occupant's choice of peripherals. Each of these trays 015 and 018 are accompanied by adjustable bearings (foot tray bearings 013, peripheral tray bearings 016) that can be loosened and tightened by the occupant to allow for custom positioning of the respective tray. This free positioning allows occupants of all sizes to be able to set the peripheral 018 and foot 015 trays to locations that are comfortable and useful. In addition both the foot 015 and peripheral 018 trays contain variable-length adjustable extension arms (foot tray extension arm 014, peripheral tray extension arms 017) which allow for shortening and lengthening of the arms that support their respective trays.

Pictured in FIG. 2 is a front side view of the motion platform 100. This illustration shows the seat 008 and a set of pins 009L and 009R and 010L and 010R which allow the seat 008 to be locked in place for use, but also allow the seat to be released from this usage position and folded down into the storage position. The top seat pins, both left 009L and right 009R, mount the seat 008 to the very top of the interior of the pitch rotary frame 011 on both sides. These pins 009L and 009R, while removeable for seat replacement, are kept in place and allow the top seat frames 041L and 041R to rotate around the top seat pins 009L/009R and within the pitch rotary frame 011. The bottom seat pins, both left 010L and right 010R, are removable in that the seat 008 can be detached from the lower interior portion of the pitch rotary frame 011 on both sides. When the motion platform 100 is setup for usage, these pins 010L and 010R are in place and lock the bottom seat frames 042L and 042R, into the lower interior portion of the pitch rotary frame 011. When the motion platform 100 is being collapsed for storage, the bottom pins 010L and 010R pullout of the pitch rotary frame interior 011 on both sides and allow the bottom portion of the seat 008 to slide forward to eventually lie along the same plane as the roll/yaw rotary frame 004.

FIG. 3 illustrates the roll/yaw acuator 038 which is composed of a housing, gearing, and a motor. The motor contained in the roll/yaw rotary actuator may be a DC stepper motor which with the aide of a gear provides the rotary motion of the rotary actuator. The DC motor component of the roll/yaw actuator 038 could contain a positional sensor and a brake to allow for precision motion control. The motor component of this electrical actuator may alternatively be an AC servo motor or the actuator itself may be actuated from fluid or air pressure instead of through electrical current. Also shown is the roll/yaw actuator housing 023. The housing 023 for the roll/yaw actuator 038 is attached to the bottom roll/yaw frame mount and slider 005B. The housing 023 rotates around a locking pin 049 which attaches the roll/yaw-axis motor housing 023 to the bottom roll/yaw rotary frame mount and slider 005B. The roll/yaw rotary frame 004 rotates about a pin inserted in hole 049, and in part, allows the motion platform 100 to slide and be setup for use or collapsed for storage. The housing 023 itself is fixated to the outer frame component, the stationary portion, of the rotary actuator 038 while the interior rotary table, which rotates to provide the rotary motion for the roll/yaw axis, is fixed to the lower end of the roll/yaw rotary frame 004.

FIG. 4 illustrates the top roll/yaw rotary frame mount and top slider 005T, the top bearing (or bushing) and housing 007 for the roll/yaw rotary frame 004, as well as the locking pin 044 which locks the top roll/yaw rotary frame mount and slider 005T into position on the main vertical support flame 002. The top of the roll/yaw rotary frame 004 fits into and rests within the bearing which is itself encased within a housing arrangement 007. The bearing housing 007, with its internal bearing, attaches to the top roll/yaw rotary frame mount and slider 005T via a locking pin 044. The top bearing housing 007, along with the roll/yaw rotary flame 004 rotates around the locking pin 044, which, in part, allows the motion platform 100 to be setup for use or collapsed for storage. The locking pin 044 can be removed to detach the bearing and housing 007, along with the attached roll/yaw rotary flame 004, from the vertical support flame 002 and top roll/yaw rotary flame mount and slider 005T. When the motion platform 100 is collapsed for storage, in this embodiment, this top locking pin 044 must be removed to detach the top roll/yaw rotary flame mount and slider 005T from the bearing and housing 007 and the rest of the roll/yaw rotary frame assembly. This detachment is necessary to allow the enclosure case 001 to close fully for storage. Other embodiments, such as the one depicted in FIG. 17, do not require any detachment or locking pin manipulation what-so-ever when collapsing the invention for storage.

FIG. 5 illustrates one of the pitch axis shafts 012R along with one of the pitch axis bearings (or bushing) and accompanying housing arrangement 006R, all components of the complete pitch rotary frame assembly. These housings, with their internal bearings 006R, are embedded into the outer frame—the roll/yaw rotary frame 004. Although the illustration only shows one shaft 012R, two pitch axis shafts 012L and 012R are attached to the outer portion on either side of the pitch rotary frame 011. These shafts 012L and 012R fit into and rest within the pitch axis bearings 006L and 006R which are encased in their own housings and embedded within the roll/yaw rotary frame 004.

The right top 009R and bottom 010R seat pins are also illustrated in FIG. 5. There are corresponding parts to 009R and 010R that exist on the left side of the motion platform 100 and are labeled 009L and 010L. The top pins 009R and 009L remain in place for both the setup and collapsed configurations of the motion platform 100. The bottom seat pins 010R and 010L pull out from, or detach from, the pitch rotary frame 011 and allow the seat 008 to become closely parallel with the roll/yaw rotary frame 004 for collapsing and storage.

In FIG. 6, the pitch-axis motor and actuator 021 and pitch-axis motor mounts 020 and 040 are illustrated. The pitch-axis motor mount assembly on the roll/yaw rotary frame 020 and the pitch rotary frame 040 are joined together. The pitch-axis actuator 021 and motor mounts 020 and 040 are positioned behind the occupant seat 008 and may be placed in a variety of distances from the pitch-axis point of rotation. The rotary flames allow for these variations in the distance between the actuator and the point of rotation, and this distance is what determines the amount of stroke and force required by the actuator 021 in order to move the motion platform 100 and occupant about the pitch-axis. In total, 30 degrees of motion on the pitch degree of freedom are capable in this motion platform 100. The present illustration shows a distance of 11 inches between the pitch-axis point of rotation and the top mount for the pitch actuator although this distance can be modified to accommodate many different types of linear actuators with varying stroke, speed and force capability.

When all of the four seat pins 009L and 009R and 010L and 010R are in place, the pitch frame 011 and the seat 008 act as one assembled unit. When the pitch-axis actuator 021 strokes out, (or up), the pitch rotary frame 011 and seat 008 are pushed forward rotating around the pitch axis. When the pitch-axis actuator 021 is stroked in, (or down), the pitch frame 011 and seat 008 tilt backwards rotating around the pitch axis. A rotary actuator, like the one depicted in FIGS. 3 and 17 could be used instead of a linear actuator for actuation of the pitch axis.

The peripheral tray 018 is also shown in FIG. 6. The peripheral tray 018 is used as a platform or shelf for the occupant's choice of peripherals. Directly beneath the peripheral tray 018 is the switchbox 019 which could also be called the occupant's control panel. The switchbox 019 is a housing for a series of controls and indications for the motion platform 100. These controls in left to right order are: the on/off switch 032, status and indicator LEDs 033 and 034 and 035, a real-time motion adjustment or regulator dial 037, and the safety pullout keycard 030 inserted into the safety keycard slot 031. Additional controls not depicted include motion regulators for realtime control of both the acceleration and the range of motion for each degree of freedom, a control for each degree of freedom that switches the motion to an opposite actuation direction which might be used in the case of a driving simulation where motion commands are derived from the user controller, and a control for motion command origination, toggling between the user controller and the gaming hardware system.

The on/off switch 032 turns the power on or off to the whole system. The status and indicator LEDs 033 and 034 and 035 are used to indicate problems or errors (033—red LED), initialization when the motion platform 100 is first powered on (034—yellow LED), or a ready state (035—green LED). The dial 037 can allow the occupant of the motion platform 100 to regulate either the motion range, acceleration or "motion sensitivity", in real time, as their video game, or other application, proceeds. This dial 037 in this embodiment is an analog potentiometer—whose position can be read electronically. One or more dials 037 could be used for individual axis control. The position of the dial 037 would be used in the motion control algorithm and control a factor that will be used in the software algorithm that determines motion response. The factor controlled by the dial 037 could translate into the overall speed of motion of the motion platform 100, or the range of motion for the applied axis(es), among other factors, as the game is being played. There is a spectrum of values that the dial 037 can be set to. When the dial 037 is set to the lower end of the spectrum, this low setting could limit the speed of the motion or stop motion altogether. A setting towards the higher end of the spectrum might be closer to the normal speed of the motion, or allow the greatest range of motion, as it is inputted from the game device. Lower settings could be used for younger occupant's and may be used as a safety feature that is controlled over parental control only. The last item housed in the switch box is the safety key card 030 which must be present and in place securely in the safety key card slot 031 in order for the motion platform 100 to be electrically powered. This safety key card 030 is similar to those used in today's treadmills and is a safety feature. In the case of malfunction or occupant distress, the key card 030 may be removed from its slot 031, which will instantly turn power off to the motion platform 100.

FIG. 7 illustrates the range of motion of the pitch axis for the motion platform 100. The motion platform 100 allows for nearly 30 degrees of total motion along the pitch degree of freedom. Nearly 15 degrees pitched forward from the "home" or "initialized" position, and nearly 15 degrees pitched backwards from the "home" or "initialized" position. The nearly 30 degrees of total pitch motion is along the pitch rotational axis.

FIG. 8 illustrates the range of motion of the roll/yaw axis for the motion platform 100. The motion platform 100 allows for nearly 30 degrees of total motion along the roll/yaw degree of freedom. Nearly 15 degrees towards the left side from the "home" or "initialized" position, and nearly 15 degrees towards the right side from the "home" or "initialized" position. The nearly 30 degrees of total roll/yaw motion is about the roll/yaw rotational axis.

FIG. 9 illustrates one example of how the motion platform 100 may be used in the home. The motion platform 100 can be placed directly in front of a television set and game console device. The occupant would hookup their joystick or other controller device as they normally would into the game console. A cable is also connected from an external data port on the game console to an accessible data port on the exterior of the electronics housing 029 of the motion platform 100. Motion commands are sent from the game software to the data port on the game console. The commands on the data port of the game console are then sent over this cable directly to the motion platform 100 data port.

FIG. 10 illustrates a basic flow chart of command processing for one embodiment. The motion platform's 100 interface to the PC, game system, or equivalent for the application, can be accomplished via a software interface between the game console and the motion platform 100. Motion commands defined in a game accessible software interface are called in realtime, (as the game is being played), and can be sent from a data port on the game console or PC, to the motion platform 100.

The drive and control motion system of one embodiment of the motion platform 100 is comprised of two DC stepper motors and drives. One linear actuator is used for the pitch degree of freedom, and one rotary actuator for the roll/yaw degree of freedom. A linear slide could be used to provide a heave degree of freedom and rotary and linear actuators can be used interchangeably on any degree of freedom. The motors and drives of this one example embodiment are controlled via a Programmable Logic Controller (hereinafter PLC). The PLC interprets and responds to motion input commands that can be initiated and relayed from a microprocessor, from the game player's controller(s), or from the game or application software directly. The PLC, in this embodiment, would directly access the positions of any motion dials, analog potentiometers as one possibility, and other user configurable motion controls positioned on the user control panel for inclusion in any motion response calculations.

The command processing begins at the command input module 046 which represents the source of the motion commands provided to a PIC microcontroller 027 in this embodiment. The microcontroller is an example for this embodiment and may be interchanged with any computer component. The motion commands may be generated by the game software which outputs the motion command data from a data port on the game console or computer. The motion commands may also come directly from a controlling peripheral.

Command processing may also be accomplished through telemetry. If the motion commands are sent from a game console or PC, the motion command data can be sent to the command source data port in motion platform 100 over an appropriate cable. If the motion commands are received from a joystick or other user peripheral, the peripheral itself could be plugged straight into the command source data port on the exterior of the electronics housing of the motion platform 100. The type of port and protocol of data could be USB, USB2, Firewire or any other protocol which is understandable and interprettable by the PIC microcontroller 027 and accompanying electronics which is receiving the inputted motion commands. The microcontroller 027 will make whatever adjustments are necessary to the raw motion command data through a software alrogithm, and transmit the calculated motion commands in the appropriate format to a PLC 026 or other motion controller device. The motion device, (PLC) 026, will receive the commands via an embedded input module component of the PLC 026 and will output corresponding drive commands 024 and 025 for the axis in which the motion command is based upon. The drive commands are then relayed to the applicable driver 024 and 025 which will energize the corresponding motion axis motor/actuator 021 and 038 appropriately. An encoder/sensor 047 and 048 which is incorporated into the motor 021/038, will send position data back to the PLC 026 so that the PLC 026 will know the position of the motor/actuator 021 and 038 and the applicable axis of motion.

FIG. 11 illustrates the power flow of the motion platform 100. One power supply 045 will provide power to all of the electrical components of the motion platform 100. When the on/off switch 032 is in the on position, power will flow to the safety key card 030 and slot 031. The slot 031 and key card 030 work like a switch. If the safety key card 030 is present in the safety key card slot 031, power will continue to flow through the rest of the electrical circuit of the motion platform 100.

FIG. 12 illustrates the first stage of the collapsing of the motion platform 100—the seat 008 collapsing. Depicted in FIG. 13 is the assumed removal of the bottom seat pins 010L and 010R from both sides and the bottom seat frames 042R and 042L moving forward, or towards the front end of the motion platform 100. The bottom seat frames 042R and 042L are hinged with the top seat frames 041L and 041R which are still attached to the pitch rotary frame 011 at the top seat pins 009L and 009R. The entire seat assembly rotates about the top seat pins 009L and 009R and becomes nearly aligned, or nearly parallel to, the roll/yaw rotary frame 004. (45 degrees) The foot tray 015, the foot tray extension arm 014, and foot tray bearings 013 will have to be adjusted prior to, or during, the seat 008 collapsing to allow the seat 008 to fold all the way down to become parallel with the roll/yaw rotary frame 004.

FIG. 13 illustrates the second stage of the collapsing of the motion platform 100. It illustrates the peripheral tray 018 and foot tray 015 have been collapsed/folded down by adjusting the applicable adjustment bearings and extension arms 013 and 014 and 016 and 017. The roll/yaw rotary frame 004 and accompanying seat 008, pitch rotary frame 011, foot 015 and peripheral tray 018 assemblies, will slide down the vertical support frame 002 and along the horizontal support frame 003 to a nearly horizontal position. In order to accomplish this, the top locking pin 044, which attaches the main vertical support frame 002 to the top frame mount and slider 005T, must be removed allowing the top frame mount and slider 005T to move downward along the vertical support frame 002. The bottom locking pin 043, which attaches the main horizontal support frame 003 to the bottom frame mount and slider 005B, must also be removed to allow the roll/yaw rotary frame assembly, and internal assemblies, to travel horizontally as they are dropped into a horizontal storage position.

FIG. 14 illustrates the third stage of the collapsing of the motion platform 100 for storage. The top locking pin 044 for the roll/yaw rotary frame 004 which attaches the main vertical support frame 002 to the top frame mount and slider 005T has been removed from the main vertical support frame 002, freeing the top slider 005T and allowing the entire frames assembly to be slid towards the floor. Once the top locking pin 044 is removed, the entire frames assembly becomes completely detached from the top slider 005T and vertical support frame 002. The roll/yaw rotary frame and the rest of the frames assembly 004 lays nearly horizontal after it is detached from the vertical support frame 002.

FIG. 15 illustrates the fourth stage of the collapsing of the motion platform 100 for storage, the optional enclosure case 001 closing. Any lid stays on the enclosure case 001 will need to be removed or adjusted to allow the lid, the vertical portion of the case, to be closed. In order to close the lid, it simply needs to be pulled forward, enclosing the motion platform 100.

FIG. 16 illustrates one embodiment of the motion platform 100 ready for storage. The enclosure case 001 may have any arrangement of handles and wheels more easily allow it to be moved. The case 001 also has latches that hold the enclosure case 001 closed while it is transported. The motion platform 100 does not require an enclosure case in order to be practiced.

FIG. 17 illustrates another embodiment of the invention, that requires no disassembly for collapsibility, utilizes two rotary actuators positioned directly on the rotational axises and does not include an enclosure case. This embodiment also illustrates another method of collapsibility. To collapse this embodiment, the horizonal support frame's rear end point is slid upwards, pulling the lower, frontal, end point of the support framework back. As the horizontal support frame slides upward, the entire support framework assembly collapses remaining upright when fully closed. The seat in this embodiment collapses similarly as the seat assembly of the embodiment previously described in this description.

The bottom locking pin 043 for the roll/yaw rotary frame 004, which attaches the main horizontal support frame 003 to the bottom frame mount and slider 005B and the top locking pin 044 for roll/yaw rotary frame 004, which attaches the main vertical support frame 002 to the top frame mount and slider 005T may alternatively be moved in and out of a locking position with electrically energized locking pins. Furthermore, the motion platform 100 is one where the platform must be setup for use manually by at least one person but this is not a necessary requirement. Two electronically controlled linear slides may be positioned along the vertical 002 and horizontal 003 support frames, whereby mounts 005T and 005B are able to be controlled into position via these linear slides automatically. Such a system would prevent any actions requiring physical exertion from the user in setting up the collapsible and portable motion platform 100. The use of such linear slides would also allow for a third degree of freedom—heave. Surge and Sway degrees of freedom may also be incorporated creating a five degree of freedom motion platform.

A collapsible motion platform with a roll/yaw degree of freedom allows the motion platform 100 to be setup directly in front of a television, monitor, or other video output device without visual obstruction coming from the frames or other components of the motion platform. The advantage of the use of a roll/yaw degree of freedom exists while televisions are the popular video output medium. Other display technologies are becoming more popular with use in video gaming and simulation, and are already required as a component of Virtual Reality systems—head mounted displays. Head mounted displays can also be called immersion glasses, goggles, or Virtual Reality helmets and can be described as a device used in video gaming, simulation, and virtual reality, whereby a headset that contains video, and sometimes audial, output is worn on the head of the user. The immersion headset allows the user to become surrounded, immersed, in game play with no, or little, external audial or video stimulus from sources outside the game or simulation.

Conclusion

The described embodiments of the invention are intended to be merely exemplary. Of course, it is not possible to describe every conceivable combination of components or methodologies for purposes of describing the systems, methods, and apparatuses for accomplishing the various objectives of the invention. One of ordinary skill in the art may recognize that further combinations and permutations are possible. Accordingly, this application is intended to embrace alterations, modifications, and variations that fall within the scope of the appended claims and their equivalents.

I claim:

1. A collapsible motion platform comprising:
   a support framework assembly including a support frame and a first rotary frame, said support framework assembly having an expanded position and a collapsed position; and
   an actuator for moving said first rotary frame in response to a command signal from a motion control system; and
   a seat for an occupant,
   wherein, in said expanded position, said support frame is generally vertical
   and wherein, in said collapsed position, said support frame, said seat, and said rotary frame are oriented generally along a similar plane.

2. The motion platform of claim 1, further comprising:
   a second rotary frame connected to said support framework assembly and positioned inside said first rotary frame; and
   an actuator for moving said second rotary frame in response to a command signal from said motion control system.

3. The motion platform of claim 1, further comprising:
   a second support frame wherein, said second support frame is generally horizontal.

4. The motion platform of claim 1, further comprising:
   an actuator connected to the rear end point of said first rotary frame for moving said first rotary frame in a heave degree of freedom in response to a command signal from said motion control system.

5. The motion platform of claim 1, wherein said motion platform is portable.

6. The motion platform of claim 4, wherein said motion platform is portable.

7. The motion platform of claim 1, wherein said first rotary frame rotates about a roll/yaw axis,
   and wherein the angle between said first rotary frame and a horizontal plane is between 1 degrees to 89 degrees when said support framework assembly is in its expanded position.

8. The motion platform of claim 4, wherein said first rotary frame rotates about a roll/yaw axis,
   and wherein the angle between said first rotary frame and a horizontal plane is between 1 degrees to 89 degrees when said support framework assembly is in its expanded position.

9. The motion platform of claim 1, wherein said command signal is received from a user specified source,
   and wherein said source is either an external computer component or a user input peripheral.

10. The motion platform of claim 4, wherein said command signal is received from a user specified source,
    and wherein said source is either an external computer component or a user input peripheral.

11. The motion platform of claim 1, further comprising:
    a user accessible regulator device for adjusting the acceleration of said first rotary frame, and to provide an input variable in calculation of said command signal.

12. The motion platform of claim 4, further comprising:
    a user accessible regulator device for adjusting the acceleration of said first rotary frame, and to provide an input variable in calculation of said command signal.

13. The motion platform of claim 1, further comprising:
    a user accessible regulator device for adjusting the maximum limits of rotation, or range of motion, of said rotary frame, and to provide an input variable in calculation of said command signal.

14. The motion platform of claim 4, further comprising:
    a user accessible regulator device for adjusting the maximum limits of rotation, or range of motion, of said rotary frame, and to provide an input variable in calculation of said command signal.

15. The motion platform of claim 1, further comprising:
    a mechanism operable to open said motion platform from said collapsed position to said expanded position.

16. The motion platform of claim 1, further comprising:
    a case configured to generally enclose said motion platform in its collapsed position.

17. The motion platform of claim 16, wherein said case includes a first portion and a second portion,
    and wherein said first portion is connected to a first support, and a second portion is connected to said second support.

18. The motion platform of claim 1, further comprising:
    a standard software interface configured to send and receive motion command signals to and from a game system.

19. The motion platform of claim 1, further comprising:
a standard software interface configured to send and receive motion command signals to and from a game system.

20. The motion platform of claim 1, further comprising:
a safety key card for insertion into a safety shutoff device configured to stop the motion of said platform if said key card is removed by means of terminating power flow.

21. The motion platform of claim 4, further comprising:
a safety key card for insertion into a safety shutoff device configured to stop the motion of said platform if said key card is removed by means of terminating power flow.

22. The motion platform of claim 1, further comprising:
a peripheral tray variably positioned within reach and comfort of a user operating said platform, said peripheral tray sized and shaped to hold one or more peripheral devices.

23. The motion platform of claim 4, further comprising:
a peripheral tray variably positioned within reach and comfort of a user operating said platform, said peripheral tray sized and shaped to hold one or more peripheral devices.

24. The motion platform of claim 22, further comprising:
a switch box and control panel mounted to said peripheral tray.

25. The motion platform of claim 23, further comprising:
a switch box and control panel mounted to said peripheral tray.

26. The motion platform of claim 24, further comprising:
one or more LED status indicators positioned within view of a user operating said platform.

27. The motion platform of claim 25, further comprising:
one or more LED status indicators positioned within view of a user operating said platform.

* * * * *